US012276958B2

(12) United States Patent
Akai et al.

(10) Patent No.: US 12,276,958 B2
(45) Date of Patent: Apr. 15, 2025

(54) CONTROL SYSTEM, SETTING DEVICE, AND COMPUTER-READABLE STORAGE MEDIUM

(71) Applicant: OMRON CORPORATION, Kyoto (JP)

(72) Inventors: Ryota Akai, Kyoto (JP); Mitsuhiro Yoneda, Kyoto (JP); Taiga Niimi, Kyoto (JP); Nobuyuki Sakatani, Kyoto (JP); Shigenori Sawada, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 420 days.

(21) Appl. No.: 17/597,124

(22) PCT Filed: Mar. 10, 2020

(86) PCT No.: PCT/JP2020/010343
§ 371 (c)(1),
(2) Date: Dec. 27, 2021

(87) PCT Pub. No.: WO2021/002059
PCT Pub. Date: Jan. 7, 2021

(65) Prior Publication Data

US 2022/0244697 A1 Aug. 4, 2022

(30) Foreign Application Priority Data

Jul. 3, 2019 (JP) ................................ 2019-124437

(51) Int. Cl.
*G05B 19/05* (2006.01)

(52) U.S. Cl.
CPC ......... *G05B 19/056* (2013.01); *G05B 19/052* (2013.01); *G05B 19/054* (2013.01)

(58) Field of Classification Search
CPC .. G05B 19/056; G05B 19/052; G05B 19/054; G05B 2219/13063
See application file for complete search history.

(56) References Cited

U.S. PATENT DOCUMENTS

| | | | |
|---|---|---|---|
| 6,145,022 | A | 11/2000 | Takizawa et al. |
| 7,275,236 | B1 | 9/2007 | Kabe |

(Continued)

FOREIGN PATENT DOCUMENTS

| | | | |
|---|---|---|---|
| CN | 108693821 | A | 10/2018 |
| EP | 2 660 670 | A1 | 6/2013 |

(Continued)

OTHER PUBLICATIONS

G. Quirós, D. Cao and A. Cañedo, "Dispersed automation for industrial Internet of Things—An enabler for advanced manufacturing," 2017 13th IEEE Conference on Automation Science and Engineering (CASE), Xi'an, China, 2017, pp. 269-274 (Year: 2017).*

(Continued)

*Primary Examiner* — Christopher E. Everett
(74) *Attorney, Agent, or Firm* — Sughrue Mion, PLLC

(57) ABSTRACT

A control system includes a control target and plural devices, and the control target and the devices are connected to a network. The control system includes a program storage provided in each device storing a control program that calculates control data using data exchanged with the control target, an execution module and a disposition module. The execution module is included in each device and causes a processor to execute programs including a disposed control program. The disposition module disposes control programs in one or more of the devices. The disposition module determines a device in which the control program is disposed from among the plural devices based on a communication delay time between the devices and information about (Continued)

a resource usable for execution of the control program of each device for each control program.

14 Claims, 25 Drawing Sheets

(56) References Cited

U.S. PATENT DOCUMENTS

| | | | | |
|---|---|---|---|---|
| 7,836,168 | B1 * | 11/2010 | Vasko | G05B 19/0421 709/224 |
| 2004/0100982 | A1 * | 5/2004 | Balasubramanian | G06F 9/4887 370/429 |
| 2006/0005173 | A1 | 1/2006 | Eng | |
| 2007/0021847 | A1 * | 1/2007 | Hyodo | G06F 9/4856 700/20 |
| 2012/0265322 | A1 | 10/2012 | Hildebran et al. | |
| 2013/0028148 | A1 | 10/2013 | Koyama et al. | |
| 2013/0282148 | A1 | 10/2013 | Koyama et al. | |
| 2014/0005835 | A1 | 1/2014 | Nishiyama et al. | |
| 2014/0107809 | A1 * | 4/2014 | Ghosh | G05B 19/41835 700/9 |
| 2016/0239286 | A1 | 8/2016 | Tanaka | |
| 2016/0299796 | A1 * | 10/2016 | Wang | G05B 19/409 |
| 2018/0259929 | A1 | 9/2018 | Eguchi et al. | |
| 2018/0284710 | A1 | 10/2018 | Abe et al. | |
| 2019/0005168 | A1 | 1/2019 | Mao | |
| 2021/0135836 | A1 | 5/2021 | Yoneda | |
| 2021/0303488 | A1 * | 9/2021 | Graf | G06F 16/22 |

FOREIGN PATENT DOCUMENTS

| | | | |
|---|---|---|---|
| JP | 10-164167 | A | 6/1998 |
| JP | 10-244570 | A | 9/1998 |
| JP | 2014-099058 | A | 5/2014 |
| JP | 2014-157483 | A | 8/2014 |
| JP | 2016-151892 | A | 8/2016 |
| JP | 2019-062288 | A | 4/2019 |
| JP | 2019-106225 | A | 6/2019 |
| WO | 02/42853 | A1 | 5/2002 |
| WO | 2012/090291 | A1 | 7/2012 |

OTHER PUBLICATIONS

Chinese Office Action dated Jul. 6, 2023 in Application No. 20208004667.9.

Extended European Search Report dated Jun. 21, 2023 in Application No. 20834459.8.

Written Opinion for PCT/JP2020/010343, dated Jun. 2, 2020.

International Search Report for PCT/JP2020/010343, dated Jun. 2, 2020.

Communication dated Feb. 9, 2024 issued by the State Intellectual Property Office of the P.R. China in application No. 202080046667.9.

Office Action issued May 28, 2024 in Chinese Application No. 202080046667.9.

* cited by examiner

FIG.12

| | | | CLASSIFICATION (1) | | CLASSIFICATION (2) | CLASSIFICATION (3) |
|---|---|---|---|---|---|---|
| CLASSIFICATION | | | SMALL DELAY OF UPPER DEVICE | SMALL DELAY OF PLC | SMALL RESOURCE | NO UPPER DEVICE |
| CONDITION | PLG RESOURCE (PRO AND CON ON UPG EXECUTION) | | YES | YES | NO | YES |
| | COMMUNICATION DELAY TIME | | SMALL IN UPPER DEVICE | SMALL IN PLC | — | — |
| USE CASE | NORMAL TIME | | DISPOSITION: UPPER DEVICE, PLC<br>EXECUTION: UPPER DEVICE<br>(PATTERN 2) | DISPOSITION: UPPER DEVICE, PLC<br>EXECUTION: PLC | DISPOSITION: UPPER DEVICE<br>EXECUTION: UPPER DEVICE | DISPOSITION: PLC<br>EXECUTION: PLC<br>(PATTERN 1) |
| | ABNORMAL TIME | DISCONNECTION OF COMMUNICATION BETWEEN UPPER DEVICE AND PLC | UPG EXECUTION BY PLC (PATTERN 3) | – NO CHANGE | COMMUNICATION PATH IS CHANGED TO THROUGH ANOTHER PLC | |
| | | DISCONNECTION OF COMMUNICATION BETWEEN DEVICES | – NO CHANGE | CHANGE OF EXECUTION PLACE (PATTERN 4) | – NO CHANGE | × AUTOMATIC RECOVERY CANNOT BE PERFORMED |
| | | PLC FAILURE (NORMAL SWITCHING FUNCTION) | – NO CHANGE | UPG PERFORMANCE BY UPPER DEVICE (PATTERN 5) | – NO CHANGE | UPG EXECUTION BY ANOTHER PLC |
| ADVANTAGE | | | ○ OPERATION CAN BE PERFORMED WITH HIGH PERFORMANCE BY EXECUTION OF UPPER DEVICE<br>○ AUTOMATIC DATA COMMUNICATION CAN BE RECOVERED BY EXECUTION ON PLC SIDE EVEN IN ABNORMAL TIME ON UPPER DEVICE SIDE | ○ EVEN IN DURING ABNORMAL TIME ON PLC SIDE, UPG EXECUTION CAN BE PERFORMED THROUGH PATH ON UPPER DEVICE SIDE AND BY UPPER DEVICE, AND AUTOMATIC RECOVERY CAN BE PERFORMED | ○ OPERATION CAN BE PERFORMED BY LOWCOST, LOW PERFORMANCE PLC | ○ OPERATION CAN BE PERFORMED BY NORMAL CONFIGURATION OF PLC |

| 69:UPG | REQUIRED MEMORY (KByte) | UPG EXECUTION TIME LIMIT (μs) |
|---|---|---|
| UPG(1) | 100 | 15 |
| UPG(2) | 50 | 10 |
| UPG(3) | 20 | 40 |

| 100:PLC | SECURED MEMORY (Kbyte) | UPG EXECUTION TIME (μs) | | |
|---|---|---|---|---|
| | | UPG(1) | UPG(2) | UPG(3) |
| PLC(1) | 200 ○ | 15 ○ | 10 ○ | 20 ○ |
| PLC(2) | 300 ○ | 10 ○ | 7 ○ | 45 × |
| PLC(3) | 700 ○ | 7 ○ | 5 ○ | 20 ○ |
| PLC(4) | 100 × | 25 × | 10 ○ | 50 × |
| 600:UPPER DEVICE | 10000 ○ | 5 ○ | 3 ○ | 10 ○ |

○: REQUIREMENT OF UPG ATTACHMENT INFORMATION IS SATISFIED
×: REQUIREMENT IS NOT SATISFIED

| | | | |
|---|---|---|---|
| PROGRAM NAME | UPG (1) | UPG (2) | UPG (3) |
| 533 UPG EXECUTION TIME (NORMAL TIME) | t1 | t2 | t3 |
| 314: VARIABLE | a1 b1 c1 | a2 b2 c2 | a3 b3 c3 |

CONTROL SYSTEM, SETTING DEVICE, AND COMPUTER-READABLE STORAGE MEDIUM

CROSS REFERENCE TO RELATED APPLICATIONS

This application is a National Stage of International Application No. PCT/JP2020/010343 filed Mar. 10, 2020, claiming priority based on Japanese Patent Application No. 2019-124437 filed Jul. 3, 2019.

TECHNICAL FIELD

The present disclosure relates to a control system, a setting device, and a computer program for controlling a target.

BACKGROUND ART

A factory automation (FA) system using a control device such as a programmable logic controller (PLC) is widely used in various production sites. The PLC executes a control program of a control target such as a field device including a robot. In recent years, a scale of the FA system tends to increase, and accordingly, the PLC included in the FA system increases.

For example, Japanese Patent Laying-Open No. 10-164167 (PTL 1) discloses a programmable controller that conducts cyclic communication with another programmable controller through a communication device as a system including a plurality of PLCs.

CITATION LIST

Patent Literature

PTL 1: Japanese Patent Laying-Open No. 10-164167

SUMMARY OF INVENTION

Technical Problem

Conventionally, the PLC that operates each control program is fixed even in the system including the plurality of PLCs. On the other hand, a user needs to freely dispose the control program among the plurality of PLCs in the FA system.

An object of the present disclosure is to provide a control system, a setting device, and a program for being able to meet the above needs.

Solution to Problem

According to one aspect of the present disclosure, a control system includes a control target and a plurality of devices, the control target and the plurality of devices being connected to a network, the control system includes: program storage provided in each device storing a control program calculating control data using data exchanged with a control target; execution module configured to cause a processor to execute a plurality of programs including the disposed control program, the execution means being included in each device; and disposition module configured to dispose a plurality of control programs in at least one of the plurality of devices. The disposition module determines a device in which the control program is disposed from among the plurality of devices based on a communication delay time between the devices and information about a resource usable for execution of the control program of each device for each control program.

According to the above disclosure, when the control program is freely arranged among the plurality of devices, for each control program, the device in which the control program is to be arranged can be determined from the plurality of devices on the basis of the communication delay time between the devices and the information on the resources available for execution of the control program of each device.

In the above disclosure, the information about the resource usable for the execution of the control program of each of the devices includes a size of a storage area usable for the execution of the control program in the program storage.

According to the above disclosure, for each control program, the device in which the control program is to be disposed can be determined from among the plurality of devices based on the communication delay time between the devices and the size of the storage area usable for the execute of the control program in the program storage of each device.

In the above disclosure, the disposition module inquires of each device about the size of the storage area usable for the execution of the control program.

According to the above disclosure, the disposition module can receive the size of the storage area usable for the execution of the control program from each device by making the inquiry.

In the above disclosure, the information about the resource usable for the execution of the control program of each of the devices includes a time during which the processor is usable for the execution of the control program.

According to the above disclosure, for each control program, the device in which the control program is to be disposed can be determined from among the plurality of devices based on the communication delay time between the devices and the time during which the processor of each device is usable for the execution of the control program.

In the above disclosure, the disposition module inquires each device about a time during which the processor is usable for the execution of the control program.

According to the above disclosure, the disposition module can receive the time during which the processor is usable for the execution of the control program from each device by making the inquiry.

In the above disclosure, the control system further includes module configured to measure the communication delay time between the devices.

According to the above disclosure, the communication delay time between devices can be measured.

In the above disclosure, the communication delay time between the devices includes a communication delay time required for communication of data exchanged with the control target.

According to the above disclosure, for each control program, the device in which the control program is to be disposed from among the plurality of devices based on the communication delay time of the data used by the control program and the information about the resource usable for the execution of the control program of each device.

In the above disclosure, the plurality of devices includes an information processing device and at least one control device, the information processing device and at least one control device being time-synchronized with each other, the execution module of the information processing device causes a processor to execute the control program using data received from each of the at least one control device, the execution module of the each control device causes a processor to execute input and output program that transfers data exchanged with the control target to the information processing device and outputs the control data received from the information processing device to the control target, and the control program and the input and output program are executed within a time based on the time synchronization and shared between the each control device and the information processing device.

According to the above disclosure, an environment in which the control program execution of the information processing device and the execution of the input and output program of the control device are cooperatively executed within a shared time can be provided in the control system including the information processing device and the control device that are time-synchronized with each other. In this case, because the information processing device executes the control program disposed in the own device, the control device is not required to have an execution environment of the control program, so that the control device can be configured at low cost.

In the above disclosure, the disposition module determines a device in which the control program is disposed from among the plurality of devices based on the communication delay time between the devices and the information about the resource usable for the execution of the control program of each device for each control program in each failure mode of the control system.

According to the above disclosure, the disposition module can determine the device of the disposition destination of the control program again for each failure mode of the control system. That is, the disposition module can determine the device in which the control program is disposed from among the plurality of devices based on the communication delay time between the devices and the information about the resource usable for the execution of the control program of each device acquired in the failure mode.

In the above disclosure, the disposition module determines a device that executes the control program from among the devices for which a disposition of the control program is determined.

According to the above disclosure, the disposition module can determine the device in which the control program is executed from among the devices determined as the disposition destination of the control program.

According to another aspect of the present disclosure, a setting device performs setting on a control system including a control target and a plurality of devices, the control target and the plurality of devices being connected to a network.

Each device includes: program storage storing a control program calculating control data using data exchanged with a control target; and execution module causing a processor to execute a plurality of programs including the disposed control program. The setting device includes disposition module configured to dispose a plurality of control programs in at least one of the plurality of devices. The disposition module determines a device in which the control program is disposed from among the plurality of devices based on a communication delay time between the devices and information about a resource usable for execution of the control program of each device for each control program.

According to the above disclosure, when the control program is freely arranged among the plurality of devices, for each control program, the device in which the control program is to be arranged can be determined from the plurality of devices on the basis of the communication delay time between the devices and the information on the resources available for execution of the control program of each device.

According to still another aspect of the present disclosure, a computer-readable storage medium for storing a computer program which is a program performing setting on a control system including a control target and a plurality of devices, the control target and the plurality of devices being connected to a network.

Each device includes: program storage storing a control program calculating control data using data exchanged with a control target; and execution module causing a processor to execute a plurality of programs including the disposed control program. The computer program causes a computer to execute: acquiring a communication delay time between the devices and information about a resource usable for execution of the control program of each device for each control program; and determining a device in which the control program is disposed from among the plurality of devices based on the communication delay time between the devices and the information about the resource usable for the execution of the control program of each device for each control program.

According to the above disclosure, when the control program is freely arranged among the plurality of devices, the computer program is executed, so that the device in which the control program is to be arranged can be determined from the plurality of devices based on the communication delay time between the devices and the information on the resources of the devices that can be used to execute the control program for each control program.

Advantageous Effects of Invention

According to the present disclosure, in the control system, when the control program is freely disposed among the plurality of devices, the device in which the control program is to be disposed can be determined from among the plurality of devices based on the communication delay time between the devices and the information about the resource usable for the execution of the control program of each device.

BRIEF DESCRIPTION OF DRAWINGS

FIG. 12 is a view schematically illustrating a pattern of disposition determination of the embodiment in tabular form.

FIG. 14 is a view schematically illustrating an example of UPG attachment information 310 of the embodiment.

FIG. 15 is a view schematically illustrating an example of resource checking information 320 of the embodiment.

DESCRIPTION OF EMBODIMENTS

Figure 1:
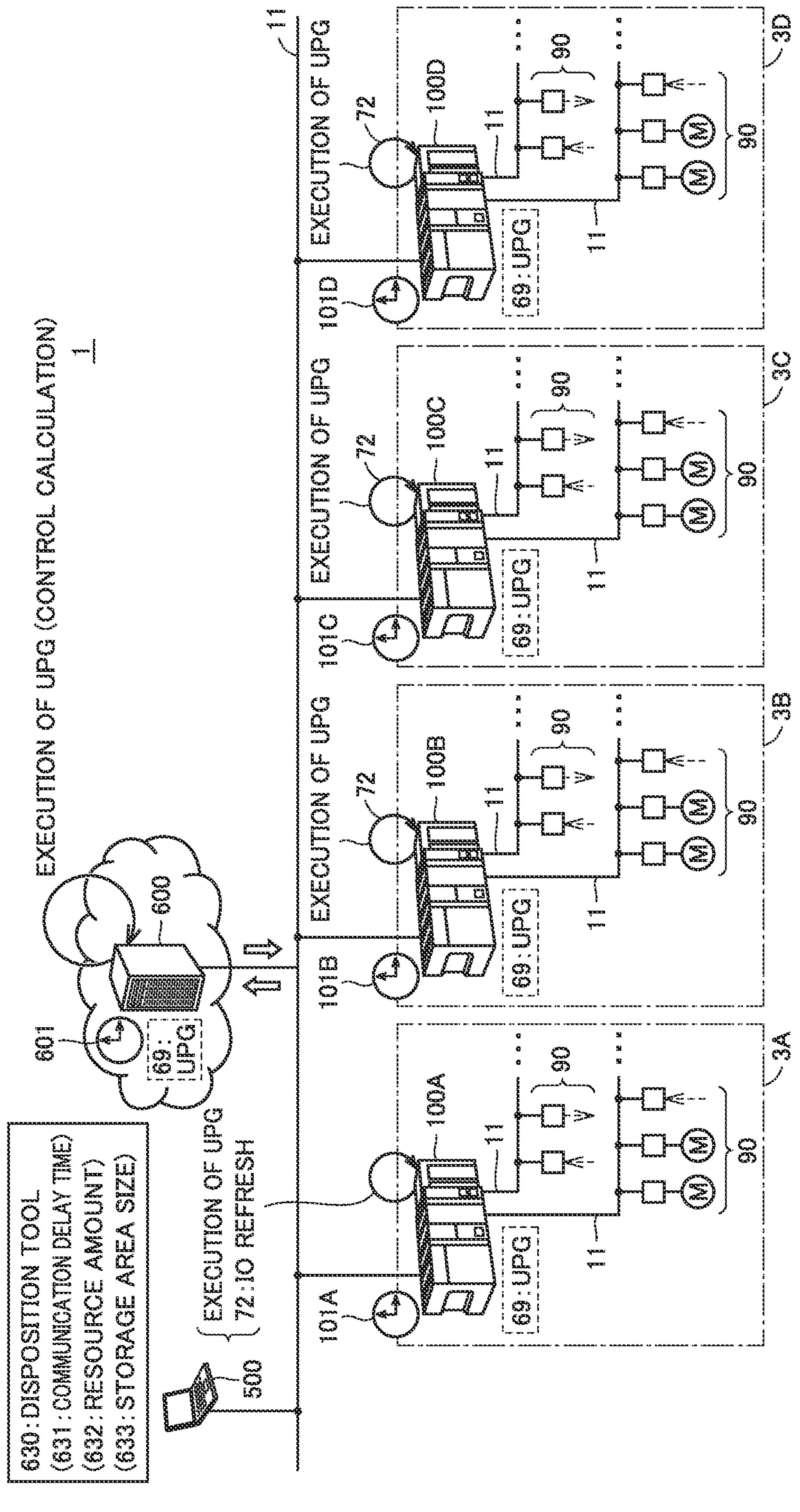
FIG. 1 is a view schematically illustrating a configuration example of a control system 1 according to an embodiment.

Hereinafter, an embodiment of the present invention will be described with reference to the drawings. In the following description, the same components and constituents are denoted by the same reference numerals. Those names and functions are the same. Thus, the detailed description thereof will not be repeated.

A. Application Example

FIG. 1 is a view schematically illustrating an example of a configuration of a control system 1 of the embodiment. Referring to FIG. 1, for example, control system 1 applicable to FA includes PLCs 100A, 100B, 100C, and 100D that are an example of the "control device", an upper device 600 that is an example of the "information processing device", and a plurality of field devices 90 that are of an example of the "control target". The control device and the information processing device are an example of a device that executes a control program controlling the control target. PLCs 100A, 100B, 100C, and 100D have similar functions, and are collectively referred to as PLC 100 unless they are distinguished from one another. PLC 100 is connected to an upper device 600 through a wired or wireless network 11. One or a plurality of field devices 90 are connected to PLC 100 through wired or wireless network 11. Control system 1 may include PLC 100 to which field device 90 is not connected.

Upper device 600 may be configured as a server in control system 1, an external server such as a cloud server, a PLC having higher performance than PLC 100, or an industrial computer (what is called an Industrial Personal Computer (IPC)).

For example, a support device 500 constructed with a general-purpose computer can be further connected to network 11. Support device 500 is an example of a "setting device" that performs setting for control system 1. In control system 1, support device 500 is provided as a device independent of PLC 100 and upper device 600, but an aspect of the provision is not limited thereto. For example, PLC 100 or upper device 600 may incorporate a function of support device 500. When PLC 100 incorporates the function of support device 500, PLC 100 may be configured as the industrial computer such as the IPC.

Support device 500 is a device that provides a support tool supporting preparation necessary for PLC 100 to control the control target. For example, the support tool is provided to the user by a user interface (UI). Specifically, support device 500 provides a development environment (program preparation and editing tool, parser, compiler, and the like) of a program executed by PLC 100, a setting environment for setting parameters (configurations) of PLC 100 and various devices connected to PLC 100, a function of transmitting a generated user program to PLC 100, a function of correcting and changing the user program executed on PLC 100 online, and the like. The user program generated by support device 500 is provided to PLC 100 or upper device 600 by being transferred to PLC 100 or upper device 600 through network 11 or through a recording medium.

Such a user program includes a control program having an instruction code of control calculation for controlling the control target, and the calculation instruction includes an instruction for calculating control data using data exchanged with the control target. The user program is arbitrarily prepared according to the control target, and includes a sequence program described using a language defined in IEC 61131-3. Hereinafter, the user program including the control program is referred to as a user program (UPG) 69.

Various field devices 90 such as a sensor and an actuator are connected to PLC 100. Field devices 90 may be directly connected to PLC 100 through an input and output unit attached to PLC 100, or may be connected to PLC 100 through network 11 on a field side. Each of field devices 90 includes an actuator that gives some physical action to a manufacturing device, a production line, or the like (hereinafter, also collectively referred to as a "field"), an input and output device that exchanges information with the field, and the like.

Field device 90 includes a device that collects a field value including a state of a control target in the field or a manufacturing device or a production line related to the control as input data. An input relay, various sensors, and the like are applicable as the device that collects such a field value. Field device 90 further includes a device that gives some action to the field based on control data including a control instruction (an instruction value, a control amount, and the like) generated by PLC 100 and data (hereinafter, also referred to as "output data") including data calculated or updated by the control program. An output relay, a contactor, a servo driver, a servo motor, and other arbitrary actuators are applicable as a device that exerts some action on such a field. Field devices 90 exchange (communicate) data including input data and output data with PLC 100 through network 11.

In control system 1, each device can exchange various data including the input data and the output data with another device at high speed. Specifically, a protocol that enables high-speed data communication is applied to the network between PLC 100 and upper device 600. Furthermore, for example, a bus or a network that conducts cyclic communication in which an arrival time of data is guaranteed according to a time-sensitive networking (TSN) standard can be adopted in network 11. For example, a network for a known protocol such as EtherNet/IP (registered trademark) may be adopted in network 11 as an upper protocol of the TSN. EtherNet/IP is an industrial open network in which a control protocol is mounted on general-purpose Ethernet (registered trademark). As described above, for example, the TSN is adopted as a unified communication protocol for the data exchange between the devices through network 11, and thus, when the data is exchanged between the devices, conversion of the communication protocol can be omitted as compared with the case where the communication protocols are different from each other, and accordingly, data communication can be conducted at a high speed. Accordingly, the data can be shared among all the devices in each control cycle.

The data exchanged between PLC 100 and field device 90 through network 11 is updated in a very short period of several 100 μsec order to several 10 msec order. The exchanged data update processing is implemented by an IO refresh 72.

PLC 100 periodically and repeatedly executes IO refresh 72 and the UPG execution in synchronization with the control cycle. IO refresh 72 is processing for periodically updating the input data and the output data with the field while the input data and the output data is synchronized with the control cycle. In PLC 100 of the embodiment, because the value referred to by UPG 69 such as the control program is managed in the form of a variable, IO refresh 72 indicates processing for periodically updating the value of the corresponding variable referred to by UPG 69.

Control system 1 performs time synchronization. Specifically, each of a timer 101A of PLC 100A, a timer 101B of PLC 100B, a timer 101C of PLC 100C, and a timer 101D of PLC 100D is synchronized with a grand master timer 601 included in upper device 600. Further, in FIG. 1, each field device 90 of a field device group 3A connected to PLC 100A is time-synchronized with timer 101A of PLC 100A. Each field device 90 of a field device group 3B connected to PLC 100B is time-synchronized with timer 101B of PLC 100B. Each field device 90 of a field device group 3C connected to PLC 100C is time-synchronized with timer 101C of PLC 100C. Each field device 90 of a field device group 3D connected to PLC 100D is time-synchronized with timer 101D of PLC 100D. Thus, the devices connected to network 11 are time-synchronized with each other.

In control system 1, a data communication environment in which the data can be shared among all the devices for each control cycle is provided, it is possible to freely arrange UPG 69 can be freely disposed instead of fixedly disposing UPG 69 as in the related art. In the embodiment, "UPG disposition" indicates that UPG 69 is downloaded to PLC 100 or upper device 600, and "disposition determination" indicates that a device of a download destination of UPG 69 is determined, more specifically, an optimum device is determined.

The support tool provided by support device 500 includes a disposition tool 630 that supports the disposition of a plurality of control programs (UPGs 69) in at least one of a plurality of devices including PLC 100 and upper device 600. In order to dispose UPG 69 in the optimum device, disposition tool 630 acquires a communication delay time 631 between the devices and a resource amount 632 indicating the resource available for the execution of UPG 69 of each device in each UPG 69, and determines the optimum device in which UPG 69 is to be disposed from the plurality of devices based on the acquired information.

In the embodiment, the "communication delay time" includes time required for the communication of the data exchanged with the control target by the control program. For example, the "communication delay time" indicates the time required from when IO refresh 72 starts the processing to when the data corresponding to all variables referred to by UPG 69 is communicated with field device 90 to complete the setting of the variables. In the embodiment, for example, since UPG 69 is designed for each manufacturing process and the variables referred to by UPG 69 in each process are generally different from each other, so that disposition tool 630 measures communication delay time 631 for each UPG 69.

In the embodiment, for example, resource amount 632 includes the size of a "storage area usable for the execution of UPG 69", and the storage area is a storage area included in a program storage device (including a storage medium) included in the device and indicates a storage area that can be provided for the execution of UPG 69. This type of storage area is a concept including a storage area included in a main memory (internal memory, primary memory) device or an auxiliary memory (external memory, secondary memory) device included in the device. However, in the embodiment, the "storage area usable for the execution of the UPG" corresponds to a memory area of the main memory device in which an instruction code of UPG 69 is deployed when the processor executes UPG 69. In the memory area of the main memory device, an area excluding the memory area in which other programs (such as a system program including an operating system (OS) and data) that executes UPG 69 are deployed becomes a memory area available for the execution of UPG 69 (deployment of UPG 69). In the embodiment, since the size of the memory area in the main memory device or the size of the system program or the like may be different in each device, disposition tool 630 measures a memory area size 633 (hereinafter, referred to as a memory area size 633) available for the execution of UPG 69 in each device for each UPG 69.

In this manner, for UPG 69, disposition tool 630 can determine the device of the disposition destination of UPG 69 to be optimal based on "communication delay time 631" and resource amount 632 usable for the execution of UPG 69 of each device.

More specific application examples of the embodiment will be described below.

B. Configuration of Each Device

A configuration of each device included in control system 1 will be described.

(b1. Configuration of PLC 100)

Figure 2:
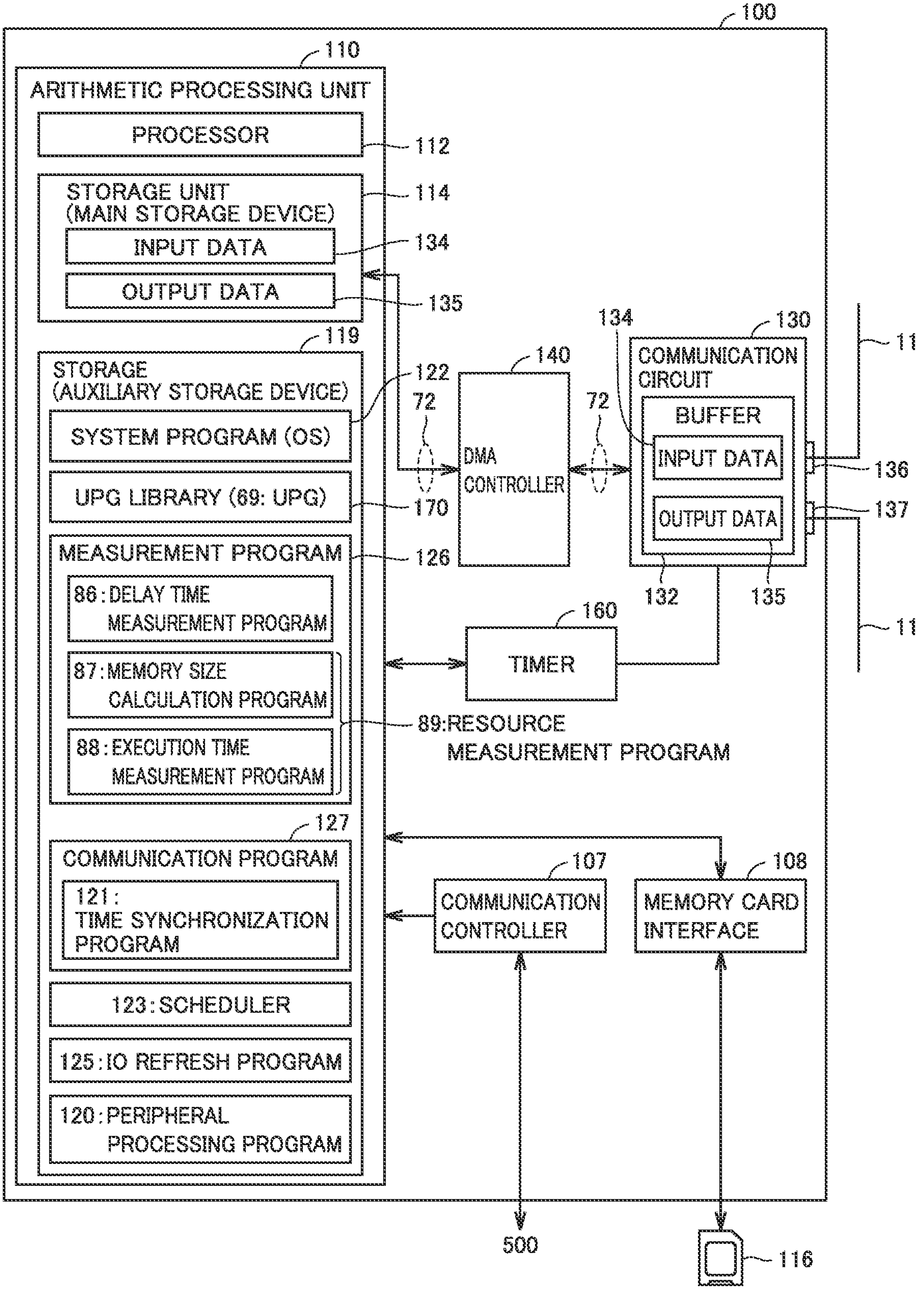
FIG. 2 is a schematic diagram illustrating a main part configuration of a PLC 100 of the embodiment.

FIG. 2 is a schematic diagram illustrating a main part configuration of PLC 100 of the embodiment. Referring to FIG. 2, PLC 100 includes an arithmetic processing unit 110, a communication circuit 130, a direct memory access (DMA) controller 140, a high-precision timer 160, a communication controller 107, communication ports 136 and 137 for connecting network 11, and a memory card interface 108. Timer 160 corresponds to timers 101A, 101B, 101C, and 101D.

Arithmetic processing unit 110 includes a processor 112, a storage unit 114 that is an example of a main memory device, and a storage 119 that is an example of an auxiliary memory device. The main memory device is constructed with a dynamic random access memory (DRAM), a static random access memory (SRAM), or the like. The auxiliary memory device is constructed with a nonvolatile storage device such as a solid state drive (SSD) and a hard disk drive (HDD).

For convenience of description, PLC 100 includes only one processor 112, but a plurality of processors may be implemented. Each processor may have a plurality of cores. In arithmetic processing unit 110, processor 112 periodically executes one or a plurality of tasks. When the plurality of tasks are executed by arithmetic processing unit 110, priorities different from each other may be set for the plurality of tasks.

Processor 112 transfers a later-described communication frame 20 (for example, input data 134 and output data 135) stored in a later-described buffer 132 of communication circuit 130 to storage unit 114. Storage unit 114 provides a work area necessary for the execution of the program in processor 112.

Storage 119 stores a peripheral processing program 120, an IO refresh program 125, a system program 122, a scheduler 123, a measurement program 126, a UPG library 170 including one or the plurality of UPGs 69, a communication program 127 including a time synchronization program 121 in order to perform the time synchronization, and the like.

System program 122 includes an operating system (OS) and a library of functions and the like. When being executed, IO refresh program 125 executes IO refresh 72. In IO refresh 72, the field value (input data) included in communication frame 20 received through communication circuit 130 is transmitted to arithmetic processing unit 110. IO refresh program 125 transmits the control data (output data) calculated by PLC 100 to network 11. In this manner, IO refresh program 125 implements IO refresh 72 that transfers at least one of the input data and the output data.

UPG 69 includes a control arithmetic program for performing a calculation based on input data 134 of storage unit 114 in order to control the control target. The control calculation includes the calculation of sequence control and motion control for controlling a behavior of, for example, a robot. A calculated value such as control data by the control arithmetic processing of UPG 69 is stored in storage unit 114 as output data 135.

Communication program 127 controls communication circuit 130 so as to generate communication frame 20 using output data 135 of storage unit 114, and transmit and receive communication frame 20. Peripheral processing program 120 is processing different from the control arithmetic processing and the like executed by UPG 69, is processing executed around the control arithmetic processing, and includes, for example, logging processing of communication frames 20 exchanged through network 11.

Scheduler 123 is an example of "execution module" that causes processor 112 to execute a plurality of programs including UPG 69. Scheduler 123 is a program that manages resource allocation, execution timing, and the like, such as a use time of processor 112, with respect to a process, a task, and the like of PLC 100 according to the priority. Such a process or task includes a process or task that can be generated by processor 112 executing peripheral processing program 120, UPG 69, IO refresh program 125, time synchronization program 121, communication program 127, and the like. Scheduler 123 adjusts the execution timing of each program by processor 112 at a period based on a predetermined control cycle, for example, according to time-synchronized timer 160. Thus, PLC 100 can cyclically execute the control arithmetic processing of UPG 69 and IO refresh 72 in a period based on the time synchronized with another device.

Measurement program 126 mainly includes a program measuring (calculating) various factors for disposition determination. Specifically, measurement program 126 includes a delay time measurement program 86 measuring communication delay time 631 and a resource measurement program 89 measuring (calculating) resource amount 632 usable for the execution of UPG 69. Resource measurement program 89 includes a memory size calculation program 87 calculating storage area size 633 and an execution time measurement program 88 measuring time 634 (hereinafter, also referred to as UPG execution time 634) required from the start to the completion of the execution of UPG 69 by processor 112.

Communication controller 107 receives UPG 69 through network 11 or another communication path. Memory card interface 108 is configured such that memory card 116 is detachable, and can write and read various data (such as a user program and data) in and from memory card 116. UPG 69 may be loaded from memory card 116 to storage 119.

Communication circuit 130 connects communication ports 136 and 137 that physically connect network 11. For example, although not limited to, communication port 136 is connected to network 11 connected to the side of another PLC 100, and communication port 137 is connected to network 11 connected to the side of field device 90. Communication circuit 130 exchanges communication frame 20 with another device through communication port 136, 137. Communication circuit 130 includes a buffer 132 that temporarily stores communication frame 20 transmitted and received through network 11. For example, communication frame 20 temporarily stored in buffer 132 includes input data 134 and output data 135.

For example, communication circuit 130 transmits and receives communication frame 20 as follows. In accordance with an instruction from processor 112, communication circuit 130 copies communication frame 20 based on output data 135 from storage unit 114 through a DMA controller 140, stores the copy in buffer 132 as output data 135, and transmits communication frame 20 onto network 11.

Furthermore, in accordance with the instruction from processor 112, communication circuit 130 copies communication frame 20 arriving (received) from network 11, stores the copy in buffer 132 as input data 134, and outputs communication frame 20 to arithmetic processing unit 110. Communication frame 20 is stored in storage unit 114 as the input data.

The data of transmitted and received communication frame 20 may be accumulated in storage unit 114 over a period longer than the control cycle, or only the data of communication frame 20 in the latest control cycle may be accumulated.

In the embodiment, "TO refresh 72" executed by PLC 100 includes at least one of the transmission of output data 135 (communication frame 20) to another device and the reception of input data 134 from another device. In "TO refresh 72", input data 134 corresponds to communication frame 20 of the field value collected and transferred by field device 90, and output data 135 corresponds to communication frame 20 of the control data calculated by the control arithmetic processing of UPG 69 of PLC 100.

DMA controller 140 is connected to arithmetic processing unit 110 and communication circuit 130, and has a function of enhancing the data access between arithmetic processing unit 110 and communication circuit 130. Thus, the IO refresh processing time can be shortened and a jitter of the transmission timing can be reduced.

In the configuration of FIG. 2, for convenience of description, a configuration in which arithmetic processing unit 110, communication circuit 130, and DMA controller 140 are distinguished from each other is illustrated, but an arbitrary implementation form can be adopted without being limited thereto. For example, the configuration may be configured by a system on chip (SoC) on which all or a part of arithmetic processing unit 110 and all or a part of communication circuit 130 is mounted on the same chip. Alternatively, the SoC in which processor 112 of arithmetic processing unit 110 and the main function of DMA controller 140 are mounted on the same chip may be used. These implementation forms can be appropriately selected.

(b2. Hardware Configuration of Field Device 90)

Figure 3:
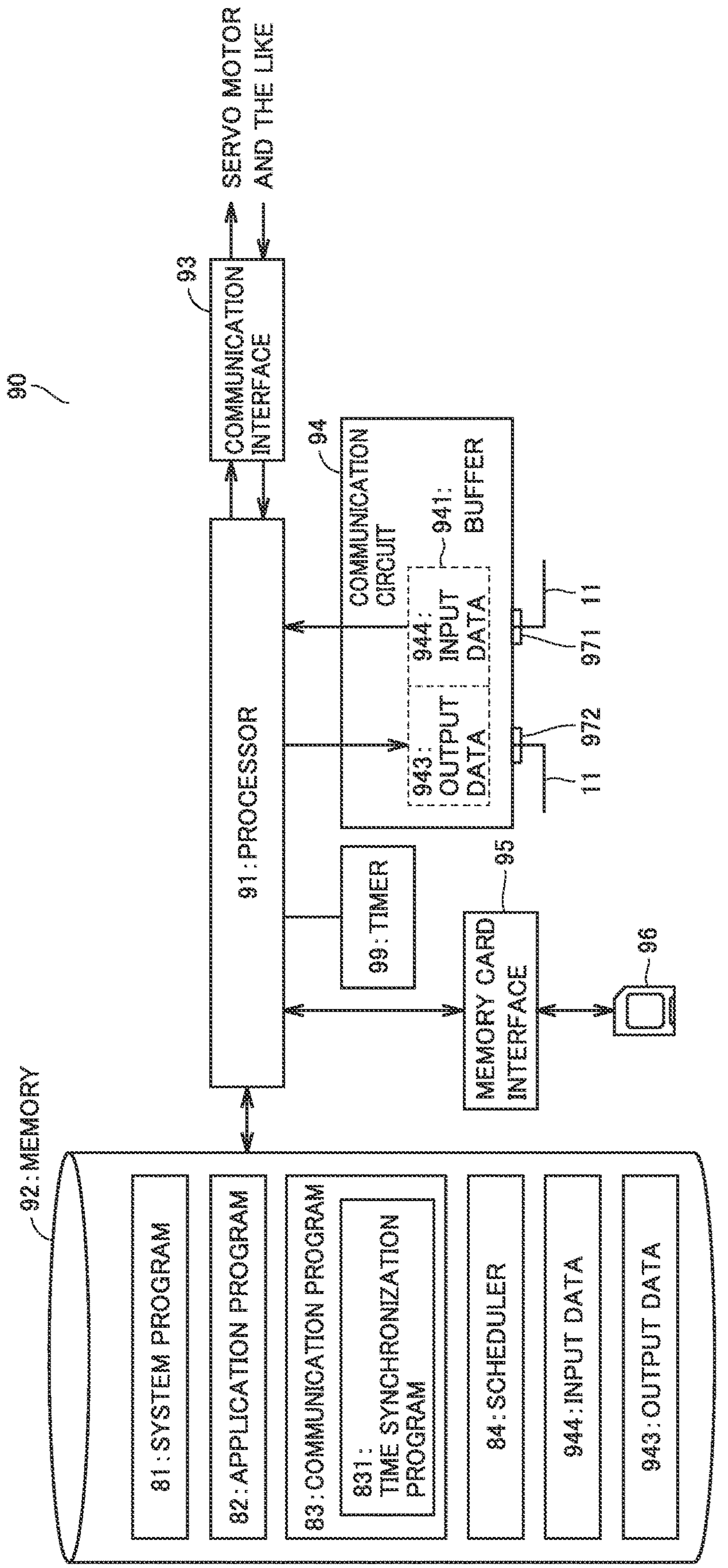
FIG. 3 is a view schematically illustrating a main part configuration of a field device 90 of the embodiment.

FIG. 3 is a view schematically illustrating a main part configuration of field device 90 of the embodiment. Referring to FIG. 3, field device 90 includes a processor 91, a memory 92, a communication interface (I/F) 93 that connects a servo motor and the like, a communication circuit 94 that connects network 11, a timer 99 including the same configuration as timer 160 of PLC 100, and a memory card interface 95 to which a memory card 96 is detachably attached. Such a device may not include a function and a circuit handling memory card 96. Accordingly, field devices 90 may also include the device that do not include the function and circuit associated with memory card 96.

In accordance with the instruction from processor 91, communication I/F 93 receives a field value from the control target and transmits the control data from processor 91 to the control target. Thus, the control target is controlled according to the instruction value and the control amount, and outputs the field value that is a result thereof.

Communication circuit 94 includes communication ports 971 and 972 that physically connect network 11. Communication circuit 94 exchanges the data with another device through communication port 971, 972. Although not limited, communication port 971 connects network 11 connected to the side of PLC 100, and communication port 972 connects network 11 connected to the side of field device 90.

Furthermore, communication circuit 94 includes a buffer 941 that temporarily stores the data transmitted and received through network 11. For example, the transmitted and received data is temporarily stored in buffer 941 as input data 944 or output data 943.

Memory 92 includes a flash memory, a hard disk, a DRAM, an SRAM, or the like, and provides the work area necessary for the execution of the program in processor 91. Memory 92 stores a system program 81, an application program 82 including the program operating the control target (servo motor, robot) and the like connected to field device 90, a communication program 83, a scheduler 84 periodically executing the program, output data 943, input data 944, and the like. Memory 92 can store the program or data from support device 500 through PLC 100 or from memory card 96 through memory card interface 95.

Communication program 83 is a program that controls communication I/F 93 and communication circuit 94. Communication program 83 includes a time synchronization program 831 that performs time synchronization.

In accordance with the instruction from processor 91, communication circuit 94 copies output data 943 of memory 92, stores the copy in buffer 941 as output data 943, and transmits output data 943 onto network 11. In accordance with the instruction from processor 91, communication circuit 94 receives the data coming from network 11, copies the received data, and stores the copy in buffer 941 as input data 944. In addition, processor 91 stores input data 944 in memory 92.

(b3. Hardware Configuration of Upper Device 600)

Figure 4:
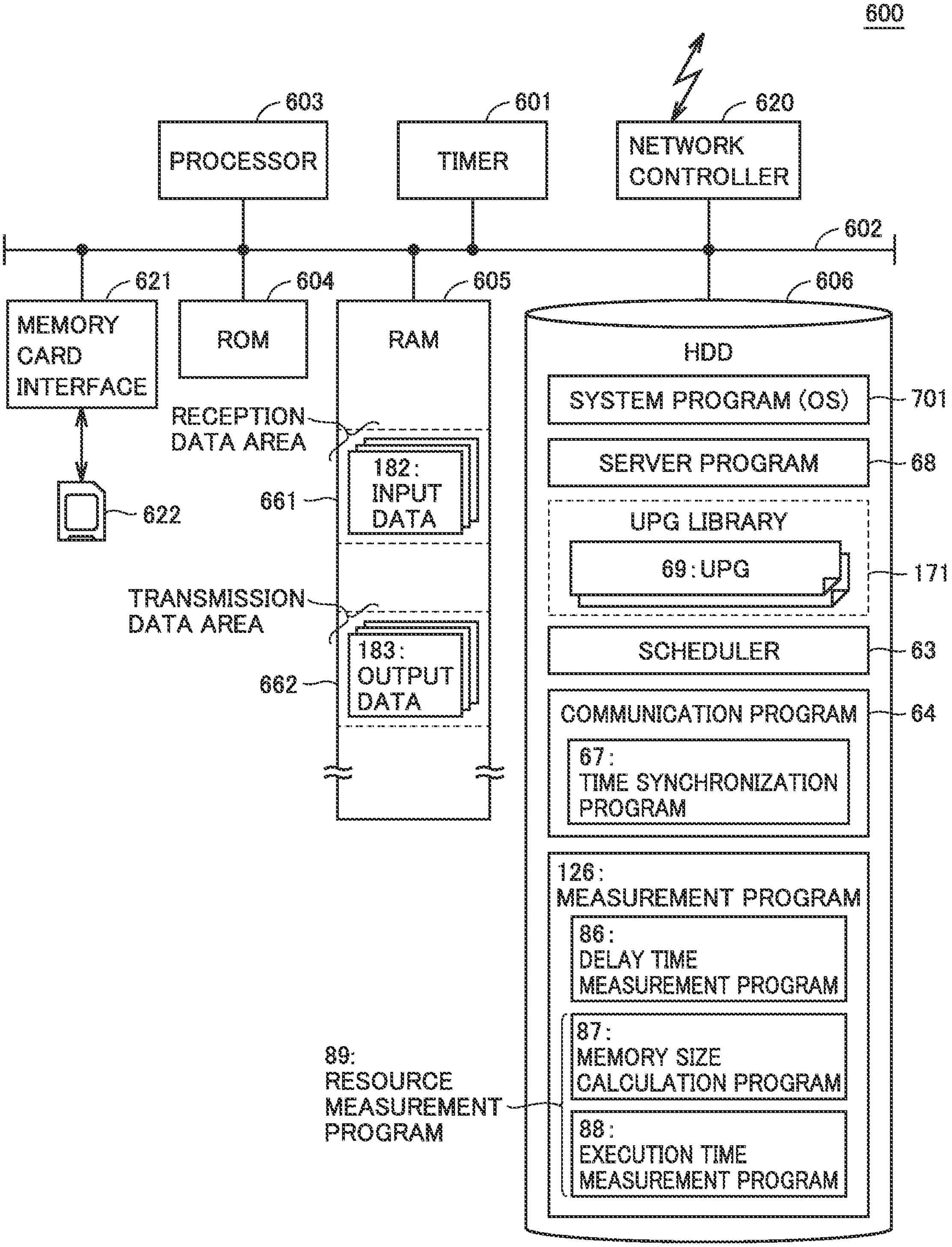
FIG. 4 is a view illustrating a configuration example of an upper device 600 of the embodiment.

FIG. 4 is a view illustrating a configuration example of upper device 600 of the embodiment. Upper device 600 has a configuration of a general-purpose computer. Referring to FIG. 4, upper device 600 includes a timer 601, a processor 603 such as a CPU or an MPU, a storage device, and a network controller 620 that exchanges the data with other devices including PLC 100. Upper device 600 further includes a memory card interface 621 to which a memory card 622 is detachably attached, memory card interface 621 reading and writing attached memory card 622.

For example, network controller 620 may include an NIC. These components are communicably connected to one another through an internal bus 602. The storage device includes a read only memory (ROM) 604, a random access memory (RAM) 605, and a hard disk drive (HDD) 606. These storage devices constitute the auxiliary memory device and the main memory device. For example, the auxiliary memory device includes a non-volatile storage device such as HDD 606 or a solid state drive (SSD). The main memory device includes a volatile storage device such as a DRAM or an SRAM included in RAM 605. Processor 603 may include a multiprocessor and be configured to execute UPGs 69 in parallel.

HDD 606 stores a system program 701 including an operating system (OS), a server program 68, a UPG library 171 storing at least one UPG 69, a communication program 64 including a time synchronization program 67 performing time synchronization, a scheduler 63, and other programs executing other pieces of processing different from the control operation of UPG 69. Similarly to PLC 100 in FIG. 2, HDD 606 stores measurement program 126 including delay time measurement program 86 and resource measurement program 89. Resource measurement program 89 includes memory size calculation program 87 and execution time measurement program 88. Processor 603 reads (deploys) the program of HDD 606 to RAM 605 and executes the program.

Scheduler 63 is an example of "execution module" that causes processor 603 to execute a plurality of programs including UPG 69. Scheduler 63 is a program that manages resource allocation, execution timing, and the like such as the use time of the processor 603 according to a priority for a process, a task, or the like of upper device 600. Such a process or task includes a process or a task that can be generated by processor 603 that executes various programs of HDD 605. For example, scheduler 63 can adjust the execution timing of each program by processor 603 at a period based on a predetermined control cycle according to time-synchronized timer 601. Thus, upper device 600 can cyclically execute the control arithmetic processing of UPG 69 in the period based on the time synchronized with another device.

RAM 605 includes a reception data area 661 in which later-described input data (transmission) 182 is stored and a transmission data area 662 in which later-described output data (reception) 183 is stored. Input data (transmission) 182 and output data (reception) 183 include an identifier of PLC 100 that is of a data transmission source or destination, a variable name, and data corresponding to the variable. Processor 603 stores input data (transmission) 182 received from PLC 100 through network controller 620 in reception data area 661. In addition, processor 603 executes the control arithmetic processing using input data (transmission) 182 of reception data area 661, and stores output data (reception) 183 that is a calculated value in transmission data area 662. The reception of input data (transmission) 182 and the transmission of output data (reception) 183 are implemented by processor 603 executing communication program 64.

(b4. Configuration of Support Device 500)

Figure 5:
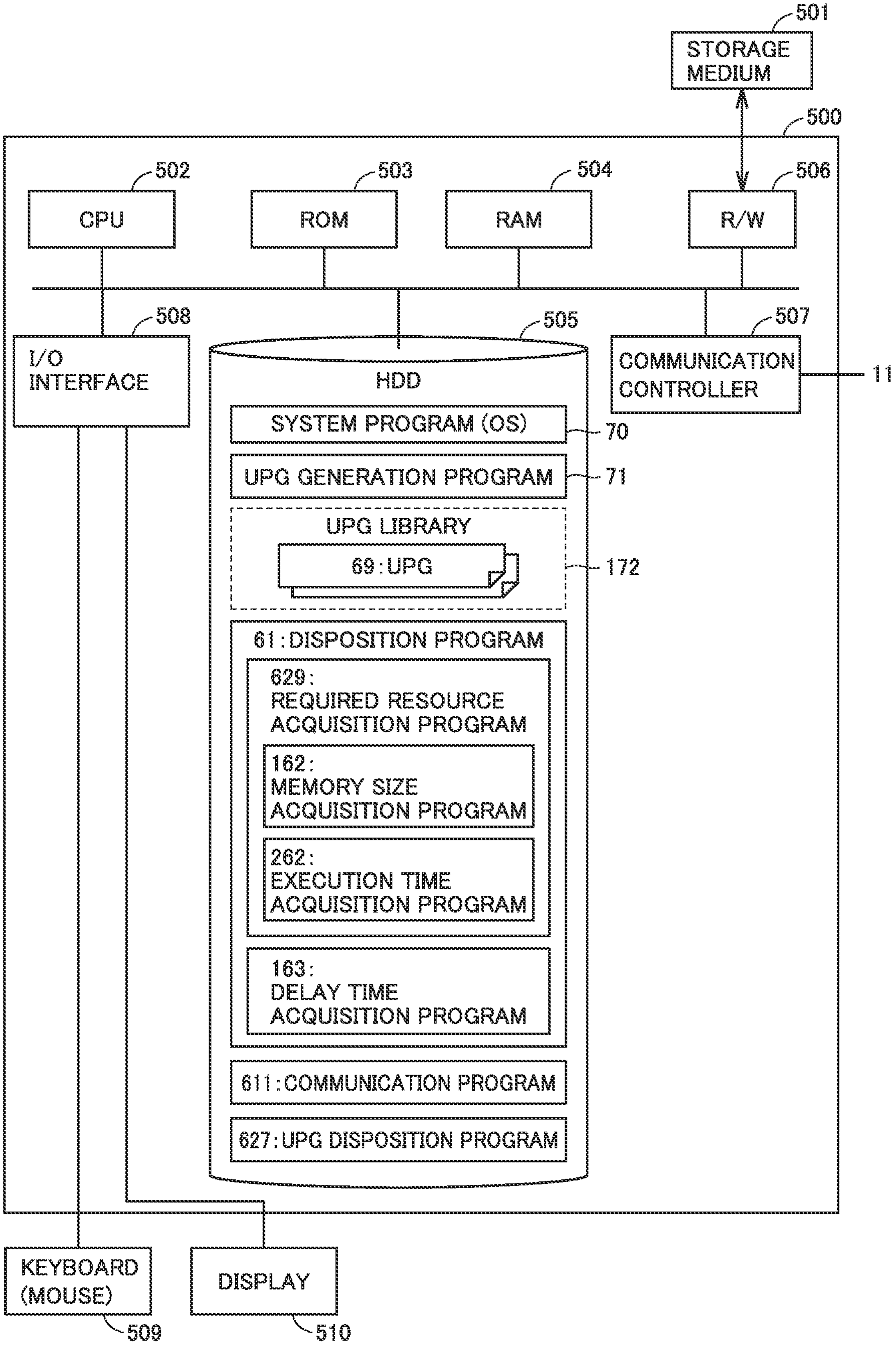
FIG. 5 is a view schematically illustrating a configuration of a support device 500 of the embodiment.

FIG. 5 is a view schematically illustrating a configuration of support device 500 of the embodiment. Referring to FIG. 5, support device 500 is a computer system that includes a central processing unit (CPU) 502 and a storage unit that stores a program and data and operates according to the program. The storage unit includes a read only memory (ROM) 503, a random access memory (RAM) 504, and a hard disk drive (HDD) 505. Support device 500 further includes a communication controller 507 and an input and output (I/O) interface 508. Support device 500 further includes a keyboard 509 and a display 510. Keyboard 509 receives the input including an instruction from the user to support device 500. In order to receive the input, support device 500 may include another device such as a mouse. Display 510 includes a liquid crystal display (LCD) or an organic electro luminescence (EL), and displays a video or an image according to a video signal or an image signal output from support device 500. Support device 500 includes a reader and writer (R/W) device 506 to which an external storage medium 501 is detachably attached, R/W device 506 reading and writing the program and/or the data from and to attached storage medium 501.

Communication controller 507 controls communication between support device 500 and an external device through network 11. For example, communication controller 507 includes a network interface card (NIC). I/O interface 508 controls data exchange between CPU 502, keyboard 509, and display 510.

HDD 505 includes a system program 70 including an OS, a UPG generation program 71 generating UPG 69, a UPG library 172 storing the generated one or the plurality of UPGs 69, a disposition program 61 implementing disposition tool 630, a communication program 611 communicating with other devices, and UPG disposition information 627 indicating the UPG disposition determined by disposition tool 630. Disposition program 61 includes a required resource acquisition program 629 acquiring resource amount 632 required for disposing UPG 69 and a delay time acquisition program 163 acquiring communication delay time 631. Required resource acquisition program 629 includes a memory size acquisition program 162 acquiring storage area size 633 from each device and an execution time acquisition program 262 acquiring UPG execution time 634 from each device. Disposition tool 630 displays UPG disposition information 627 on display 510 through I/O interface 508.

UPG generation program 71 includes an editor that edits (generates) UPG 69 according to a user operation received from keyboard 509, a compiler that compiles edited UPG 69, and a builder that converts UPG 69 into an executable format. The builder may include a compiling function.

C. Configuration of Communication Frame 20

Figure 6:
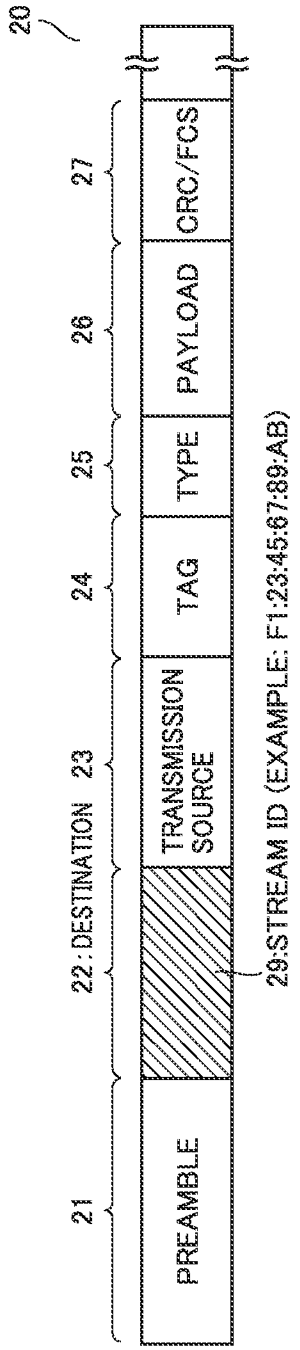
FIG. 6 is a view schematically illustrating a configuration example of a communication frame 20 of the embodiment.

In the embodiment, data transfer on network 11 is performed using, for example, a communication frame. FIG. 6 is a view schematically illustrating a configuration example of communication frame 20 of the embodiment. FIG. 6 illustrates an example of basic communication frame 20.

Referring to FIG. 6, basic communication frame 20 includes an area for storing a preamble 21, an area for storing a destination 22 of the frame, an area for storing a source 23 of the frame, an area for storing a tag 24, an area for storing a type 25 of the network, an area for storing an error correction information 27, and an area for storing a payload 26 that is a data body to be transferred. Destination 22 and source 23 of communication frame 20 include information uniquely identifying each device, for example, a media access control address (MAC). For basic communication frame 20 in FIG. 6, for example, payload 26 includes input data 134, 944 or output data 135, 943 corresponding to the field value.

Figure 7:
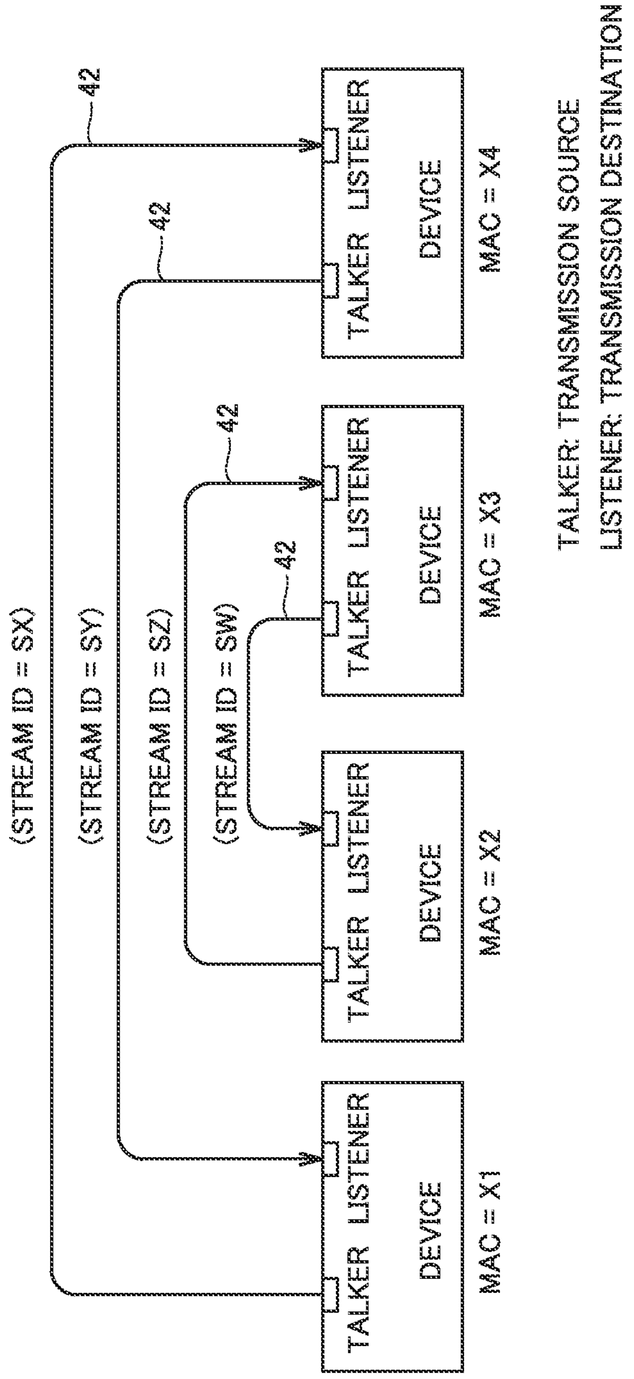
FIG. 7 is a view describing a stream ID 29 of the embodiment.

The area of destination 22 includes a stream identifier (ID) 29 managing the transfer of communication frame 20. FIG. 7 is a view describing stream ID 29 of the embodiment. In the embodiment, communication frame 20 transferred on network 11 is managed in units of a flow 42. As illustrated in FIG. 7, the device connected to network 11 can be a transmission source (TALKER) or a transmission destination (LISTENER) of communication frame 20. Stream ID 29 defined by a set of an identifier of TALKER and an identifier of LISTENER is assigned to each flow 42.

In the embodiment, when payload 26 is the control data of the output data, an identifier of a device serving as the transmission source of payload 26 (control data) is allocated to TALKER, and a MAC address of the transmission destination device (field device 90) is allocated to LISTENER. In the embodiment, when payload 26 is the field value of the input data, the MAC address of the transmission source device is allocated to TALKER, and the MAC address of the transmission destination device is allocated to LISTENER. Consequently, each device can uniquely identify each communication frame 20 to be exchanged based on stream ID 29.

(c1. Payload of Communication Frame 20)

For example, in communication frame 20 of FIG. 6, control-system data can be stored as payload 26. The area of payload 26 includes an area where the field value of the control-system data is stored and an area where the control data of the control-system data is stored.

When reading and writing the area of payload 26, for example, each field device 90 specifies a position in the area of payload 26 based on an offset (for example, the offset from a head of communication frame 20) individually allocated to the device, and reads and writes the data at the specified position. Specifically, communication program 83 reads the control data (input data 944 or output data 135) from the position based on the offset of the own device in the area of payload 26 of incoming communication frame 20, and writes the field value (output data 943 or input data 134) to the position based on the offset of the area of payload 26 of communication frame 20 to be transmitted.

On the other hand, PLC 100 stores offset information assigned to each field device 90. Accordingly, PLC 100 can read the field value (output data 943 or input data 134) of each field device 90 from the area of payload 26 of incoming communication frame 20 based on the offset information, and can write the control data (input data 944 or output data 135) to the offset position of each field device 90 in the area of payload 26 of communication frame 20 to be transmitted based on the offset information.

Thus, PLC 100 can read and write the control system data of each field device 90 in the area of payload 26 of communication frame 20, and each field device 90 can read and write the control system data of the own device in the area of payload 26 of communication frame 20.

D. Software Configuration of Device

A software configuration in each device of the embodiment of the present invention will be described.

(d1. Configuration of PLC 100 or Upper Device 600)

Figure 8:
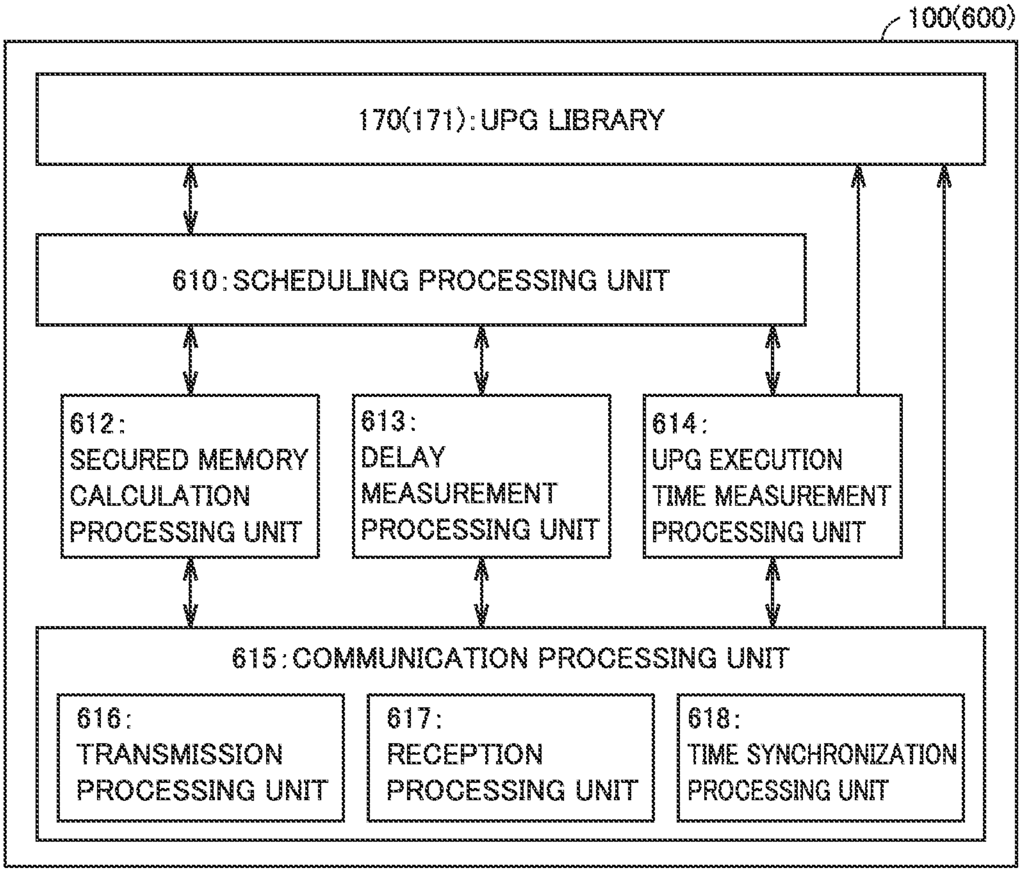
FIG. 8 is a block diagram schematically illustrating a software configuration example of the device of the embodiment.

FIG. 8 is a block diagram schematically illustrating a software configuration example of the device of the embodiment. Because the configuration in FIG. 8 is common to PLC 100 and upper device 600, PLC 100 will be described here as a representative, and the description of the configuration of upper device 600 will not be repeated.

Referring to FIG. 8, PLC 100 implements a processing unit corresponding to each program in FIG. 2 by executing each program in FIG. 2. Specifically, PLC 100 includes UPG library 170 (corresponding to UPG library 171 of upper device 600) storing UPG 69 generated by support device 500, a scheduling processing unit 610 corresponding to scheduler 123 (corresponding to scheduler 63 of upper device 600), and a communication processing unit 615 of communication program 127 (corresponding to communication program 64 of upper device 600). PLC 100 further includes a secured memory calculation processing unit 612 corresponding to memory size calculation program 87, a delay measurement processing unit 613 corresponding to delay time measurement program 86, and a UPG execution time measurement processing unit 614 corresponding to execution time measurement program 88.

In order to cause the processor to execute the program, scheduling processing unit 610 periodically allocates an idle time of the processor to various application programs including UPG 69 to adjust the execution timing of each program.

Communication processing unit 615 includes a transmission processing 616 and a reception processing unit 617 that transmit and receive communication frame 20, and a time synchronization processing unit 618 of time synchronization program 121 (corresponding to time synchronization program 67 in upper device 600).

(d2. Configuration of Support Device 500)

Figure 9:
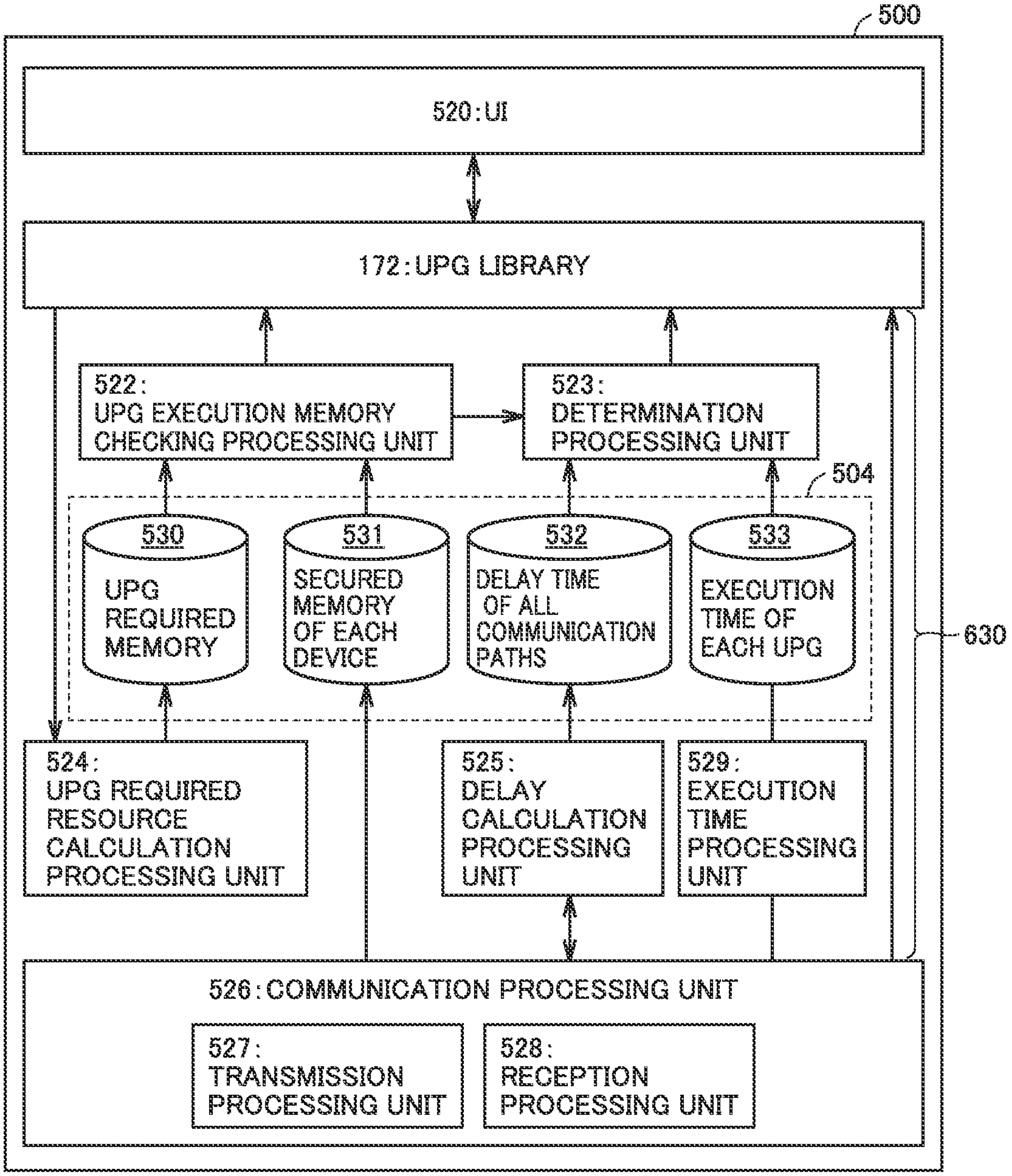
FIG. 9 is a block diagram schematically illustrating a software configuration example of the support device 500 of the embodiment.

FIG. 9 is a block diagram schematically illustrating a software configuration example of support device 500 of the embodiment.

Referring to FIG. 9, in support device 500, each program in FIG. 5 is executed to implement a processing unit corresponding to the program. Specifically, support device 500 includes a UI 520, UPG library 172, a communication processing unit 526 corresponding to communication program 611, and various programs and data providing disposition tool 630. Communication processing unit 526 includes a transmission processing unit 527 and a reception processing unit 528 that transmit and receive information to and from the external device.

UI 520 receives a user operation for a support tool including a UPG program generation tool provided by the execution of UPG generation program 71 and disposition tool 630 provided by the execution of disposition program 61. UPG 69 generated by the UPG program generation tool is stored in UPG library 172.

In order to provide disposition tool 630, support device 500 further includes a UPG required resource calculation processing unit 524 corresponding to required resource acquisition program 629, a UPG execution memory checking processing unit 522 corresponding to memory size acquisition program 162, an execution time processing unit 529 corresponding to execution time acquisition program 262, a delay calculation processing unit 525 corresponding to delay time acquisition program 163, and a determination processing unit 523 that performs the disposition determination based on information calculated (measured) by these processing units and outputs UPG disposition information 627.

Further, support device 500 stores information acquired by each processing unit of disposition tool 630 in the storage unit of RAM 504. The acquired information is information acquired for each UPG 69, and includes a UPG required memory 530 calculated by UPG required resource calculation processing unit 524, a secured memory 531 of the device received from each device, a delay time 532 of all the communication paths calculated by delay calculation processing unit 525, and an execution time 533 of each UPG. Execution time 533 of each UPG is the time that execution time processing unit 529 receives from each device and indicates the time each device can use the processor to execute the UPG. Details of UPG required memory 530, secured memory 531 of each device, delay time 532 of all communication paths, and execution time 533 of each UPG will be described later.

E. Cooperative Control

Figure 10:
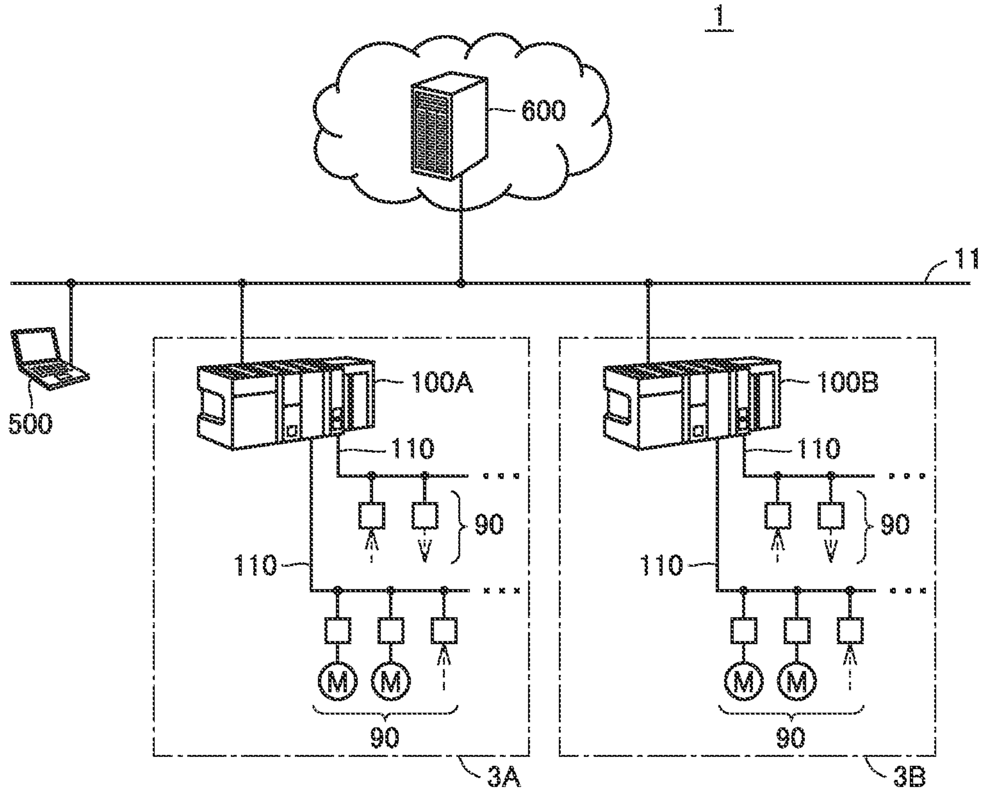
FIG. 10 is a view schematically illustrating a configuration of a control system 1 in order to describe cooperative control of the embodiment.
Figure 11:
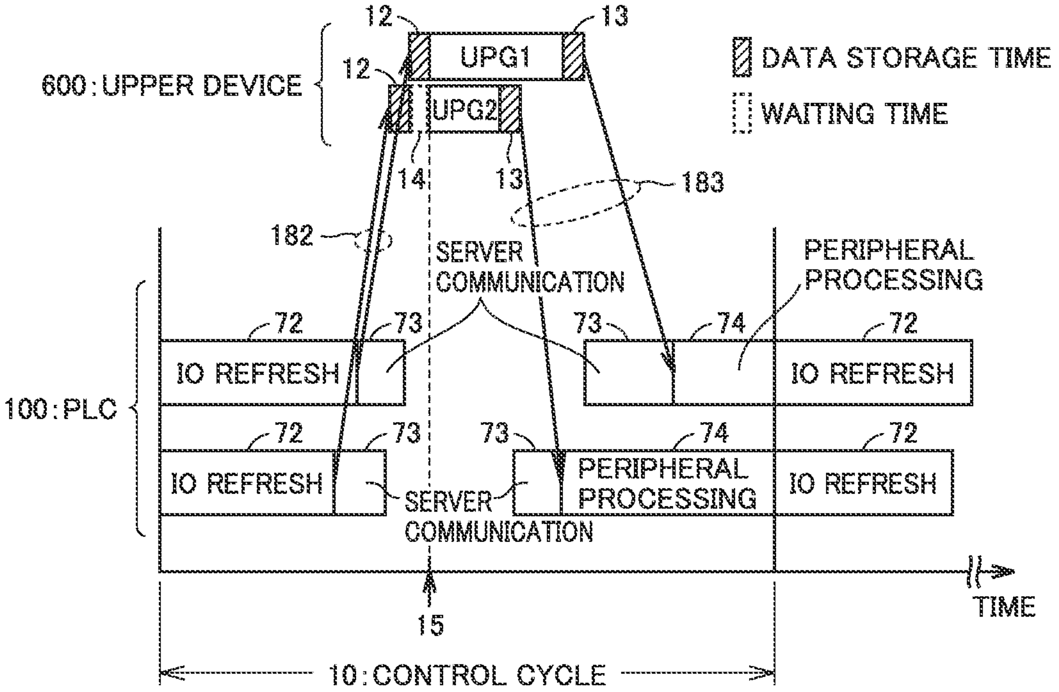
FIG. 11 is a view schematically illustrating an example of a timing chart of control system 1 in FIG. 10.

Control system 1 of the embodiment provides an environment in which upper device 600 and PLC 100 control field device 90 in cooperation. Referring to FIGS. 10 and 11, cooperative control will be described.

FIG. 10 is a view schematically illustrating a configuration of control system 1 in order to describe the cooperative control of the embodiment. Referring to FIG. 10, in control system 1, two PLCs 100 (for example, a PLC 100A and a PLC 100B) are connected to upper device 600. The number of PLCs 100 connected to upper device 600 is not limited to two, and may be at least three.

FIG. 11 is a view schematically illustrating an example of a timing chart of control system 1 in FIG. 10. In FIG. 11, the processing of field device 90 is omitted. IO refresh 72, upper communication 73, and peripheral processing 74 are sequentially executed in PLC 100. Upper device 600 in FIG. 11 executes a UPG (1) for the control arithmetic processing based on input data (transmission) 182 from PLC 100A and a UPG (2) for the control arithmetic processing based on input data (transmission) 182 from PLC 100B. UPG (1) and UPG (2) can be simultaneously started in response to a common trigger based on a synchronized time. IO refresh 72 provides a function as an input and output program in which PLC 100 transfers the input data (field value) from field device 90 to be controlled to upper device 600 and outputs the control data received from the upper device to field device 90 to be controlled.

Referring to FIG. 11, PLCs 100A, 100B start IO refresh 72 in synchronization with the start of a control cycle 10. However, a difference in time (that is, the time for completing the collection of input data (transmission) 182 that is the field value by IO refresh 72) at which upper communication 73 is started occurs due to a difference in the number of field devices 90 connected to each PLC 100, the number of input variables to be collected, the load of network 11, or the like. As described above, because the time difference in which upper communication 73 can be started occurs, in upper device 600, a data storage time 12 during which input data (transmission) 182 is received from PLC 100A and stored in area 661 is not matched with data storage time 12 during which input data (transmission) 182 is received from PLC 100B and stored in area 661, and a deviation occurs. In upper device 600, the "deviation" is adjusted by a waiting time 14. For example, upper device 600 starts the execution of UPG (1) and the execution of UPG (2) at the same time (in parallel) at a time 15 waiting time 14 elapses after the completion of the data storage of input data (transmission) 182 of PLC 100B.

In parallel execution of UPG (1) and UPG (2), UPG (2) may be executed using a calculated value of UPG (1). Thus, for example, the calculated value based on the position data (output data) from a servo device (field device 90) connected to PLC 100A can be used for determining the instruction value of the control calculation (for example, the servo device (field device 90) connected to PLC 100B) of UPG (2).

The control data (output data (reception) 183) that is the calculation value of a control operation that is an execution result of UPG (1) and UPG (2) executed in parallel is stored in area 662 for a data storage time 13. Output data (reception) 183 of area 662 is transmitted to PLCs 100A, 100B. Each of PLCs 100A, 100B completes the reception of output data (reception) 183 from upper device 600 before next control cycle 10 is started.

As illustrated in FIGS. 10 and 11, an environment in which the control arithmetic processing of UPG 69 of upper device 600 and the input and output processing (IO refresh 72) of PLC 100 are cooperatively executed within a shared time is provided in control system 1 including upper device 600 and PLC 100 that are time-synchronized with each other. At this point, PLC 100 does not need to include an execution environment of the control arithmetic processing, so that PLC 100 can (independently) control field device 90 without being restricted by the processing amount or the processing time required for the control arithmetic processing.

F. Disposition Determination

FIG. 12 is a view schematically illustrating a pattern of the disposition determination of the embodiment in tabular form. For example, the disposition determination pattern indicates pattern 1 to 6 classified by a combination of a condition based on delay time 532 of all communication paths and a resource available for UPG execution in each device and a use case in a normal condition or an abnormal condition of control system 1. The condition in FIG. 12 indicates the condition based on the resource available in PLC 100 and communication delay time 631 in the case where the resource (storage area size 633 and UPG execution time 634) of upper device 600 is sufficient to execute UPG 69.

Referring to FIG. 12, the above combinations are roughly divided into a classification (1) to a classification (3). Classification (1) corresponds to the case where each PLC 100 has the resource that can be used to execute UPG 69 and upper device 600 is connected to control system 1. Classification (2) corresponds to the case where each PLC 100 has no resource available for execution of UPG 69 and upper device 600 is connected to control system 1. Classification (3) corresponds to the case where each PLC 100 has no resource available for execution of UPG 69 and upper device 600 is not connected to control system 1.

Classification (1) includes pattern 2 at the normal condition and pattern 3 at the abnormal condition when communication delay time 631 of upper device 600 is shorter than communication delay time 631 of each PLC 100, and includes pattern 4 and pattern 5 at the abnormal condition when communication delay time 631 of each PLC 100 is shorter than communication delay time 631 of upper device 600. Classification (2) has pattern 6 at the abnormal condition, and classification (3) has pattern 1 at the normal condition.

The disposition determination in each of patterns 1 to 6 will be described as a representative, but in the embodiment, upper device 600 can communicate with PLC 100 and does not communicate with field device 90. In control system 1, the communication path between PLCs 100 includes a direct communication path and a path passing through upper device 600, and when both paths are normal, PLC 100 communicates with another PLC 100 through the direct communication path. In each pattern, in the case where there is the plurality of UPGs 69 that is the target of disposition determination, the disposition determination is performed on all UPGs 69 under the same pattern.

First, for each UPG 69, processing for checking the resource available for the execution of UPG 69 of each device and processing for checking the communication delay time between the devices will be described in order to describe each pattern.

(f1. Resource Checking Processing)

Figure 13:
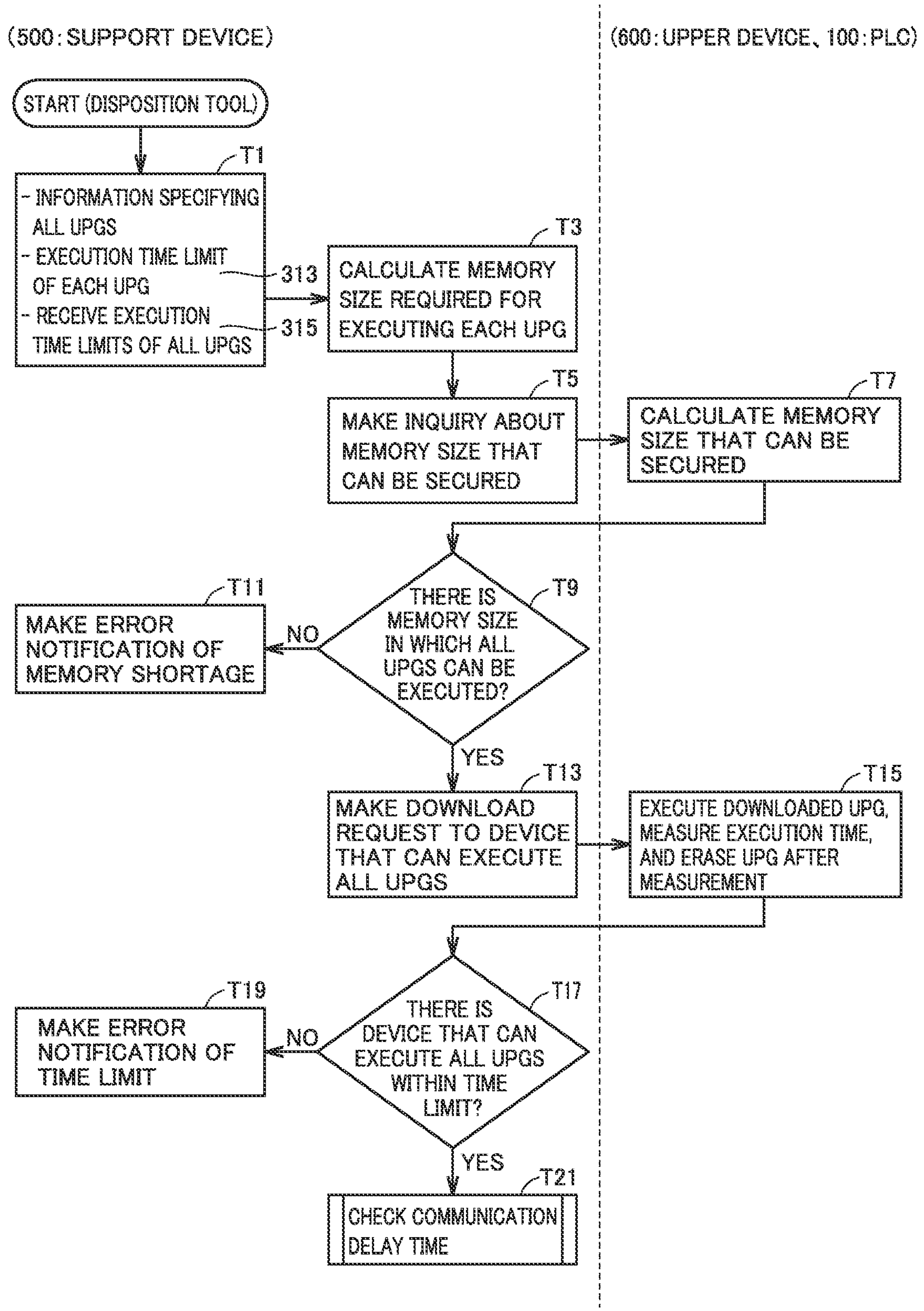
FIG. 13 is a flowchart illustrating a processing example of a UPG required resource calculation processing unit 524 of the embodiment.
Figure 16:
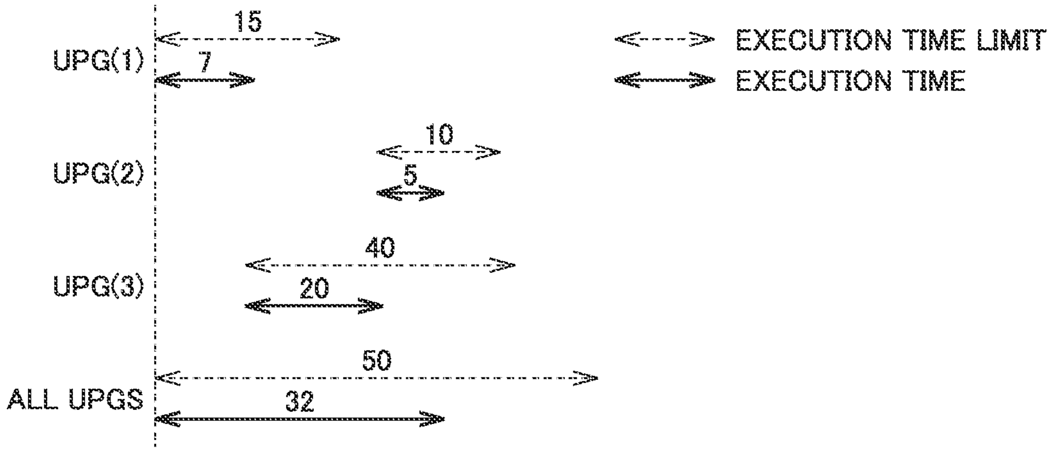
FIG. 16 is a view schematically illustrating a relationship between an execution time and an execution restriction time of the embodiment.

FIG. 13 is a flowchart illustrating a processing example of UPG required resource calculation processing unit 524 of the embodiment. FIG. 14 is a view schematically illustrating an example of UPG attachment information 310 of the embodiment. FIG. 15 is a view schematically illustrating an example of resource checking information 320 of the embodiment. FIG. 16 is a view schematically illustrating a relationship between an execution time and an execution restriction time of the embodiment.

Referring to FIG. 13, disposition tool 630 receives information specifying UPGs 69 to be executed in all processes, an execution time limit 313 set for each UPG 69, and an execution time limit 315 for all UPGs 69 through UI 520 (step T1).

In the embodiment, execution time limit 313 of UPG 69 is an upper limit value corresponding to a total of the execution time and the communication delay time required for the execution of UPG 69. Furthermore, execution time limit 315 of all UPGs 69 is an upper limit value of a sum of the totals of respective UPGs 69, and is for example, a value based on the control cycle. In FIG. 16, when UPG (1), UPG (2), and UPG (3) having the UPG attachment information 310 in FIG. 14 are executed by PLC (3), the UPG execution time (time indicated by a solid arrow in FIG. 16) measured for each UPG 69 and the execution time limit 313 (time indicated by a broken arrow in FIG. 16) of the UPG are indicated in association with each other. The numerical values shown above on the solid line arrows and the broken line arrows are values indicating time. Furthermore, the lowermost row in FIG. 16 illustrates that the sum of UPG (1), UPG (2), and UPG (3) does not exceed execution time limit 315 of all the UPGs set by the user in step T1.

UPG required resource calculation processing unit 524 specifies UPG 69 designated in step T1 in UPG library 172, and calculates UPG required memory 530 that is a memory size required for executing specified UPG 69 (step T3). For example, in the case where an object code of UPG 69 is deployed in the main memory device in executing UPG 69, UPG required resource calculation processing unit 524 can calculate UPG required memory 530 from the size of the object code. The method for calculating the required memory size is not limited thereto.

Disposition tool 630 prepares UPG attachment information 310 in FIG. 14 from the information received in step T1 and UPG required memory 530 calculated in step T3, and stores UPG attachment information 310 in RAM 504. In the embodiment, as illustrated in FIG. 14, UPG (1), UPG (2), and UPG (3) corresponding to each process are designated as UPG 69.

UPG execution memory checking processing unit 522 inquires each device about the memory size that can be secured for executing UPG 69, namely, the size of the usable storage area (step T5). UPG execution memory check processing unit 522 transmits the inquiry to each device (PLC 100 and upper device 600) through communication processing unit 526.

In each device, secured memory calculation processing unit 612 receives the inquiry from support device 500 through communication processing unit 615, calculates the memory size that can be secured for executing UPG 69 in the main memory device according to the inquiry, and transmits the calculated memory size to support device 500 as a response. The inquiry in step T5 and the response in step T7 are performed for each of UPGs (1) to (3), and UPG execution memory checking processing unit 522 determines the memory size that can be secured as the response received from each device as secured memory 531 of the device.

UPG execution memory checking processing unit 522 determines whether there is a device that can execute all of UPG (1) to UPG (3) based on the memory size indicated by secured memory 531 received from each device (step T9). Specifically, UPG execution memory checking processing unit 522 compares the total value of the memory sizes indicated by UPG required memory 530 of UPGs (1) to (3) of UPG attachment information 310 with the memory size indicated by secured memory 531 of the device, and determines whether there is the device satisfying the condition of (total value<memory size indicated by secured memory 531) based on the comparison result.

When determining that there is no device satisfying the above condition (NO in step T9), UPG execution memory checking processing unit 522 outputs an error notification of memory shortage through UI 520 (step T11). When UPG execution memory checking processing unit 522 determines that there is the device satisfying the above condition (YES in step T9), the processing proceeds to step T13.

After step T13, execution time processing unit 529 inquires and acquires the execution time of UPG 69 in each device. Specifically, execution time processing unit 529 inquires about the execution time during which UPGs (1) to (3) of UPG library 172 are downloaded (in the drawing, abbreviated as DL) to each device determined to satisfy the above conditions through communication processing unit 526 (step T13).

In the device, in response to the inquiry, UPG execution time measurement processing unit 614 executes UPG (1) to (3) downloaded from support device 500, measures UPG execution time 533 that is the execution time, and transmits measured UPG execution time 533 to support device 500 (step T15). Then, UPG execution time measurement processing unit 614 erases UPGs (1) to (3) from the main storage device.

Execution time processing unit 529 receives UPG execution time 533 of each of UPGs (1) to (3) from each device through communication processing unit 526, and determines whether there is the device that can complete the execution of all of UPGs (1) to (3) within execution time limit 313 based on received UPG execution time 533 (step T17). When determining that there is no device that can complete the execution of all of UPGs (1) to (3) within execution time limit 313 (NO in step T17), execution time processing unit 529 outputs a time limit error notification through UI 520 (step T19). When it is determined that there is the device that can complete the execution of all UPGs (1) to (3) within execution time limit 313 (YES in step T17), the communication delay time is measured to execute the checking processing of the communication delay time (step T21).

Disposition tool 630 generates resource checking information 320 in FIG. 15 using secured memory 531 of the device and UPG execution time 533 received from each device in steps T9 to T17, and stores the resource checking information 320 in RAM 504. Resource checking information 320 in FIG. 15 includes secured memory 531 of the device and UPG execution time 533 for PLCs (1) to (4) corresponding to PLCs 100A to 100D and upper device 600.

According to UPG attachment information 310 in FIG. 14 and the resource checking information 320 in FIG. 15, because the devices satisfying the above condition (total value<memory size indicated by secured memory 531) are PLCs (1) to (3) and upper device 600, UPGs (1) to (3) are downloaded to PLCs (1) to (3) and upper device 600 in step T13. The determination in step T17 is performed based on a result of the comparison of UPG execution time 533 in FIG. 15 received from each device and UPG execution time limit 313 in UPG attachment information 310 in FIG. 14. According to FIG. 15, PLC (1), PLC (3), and upper device 600 are determined to be devices that can complete the execution of all UPGs (1) to (3) within execution time limit 313 (YES in step T17). For reference, FIG. 15 also illustrates UPG execution time 533 when UPGs (1) to (3) are downloaded to PLC (4).

When the error notification of step T11 is output, for example, the user can start UPG generation program 71 to edit UPGs (1) to (3) again, thereby changing the size of UPGs (1) to (3). When the error notification in step T19 is output, for example, the user can change UPG execution time limit 313 input to support device 500 in step T1.

(f2. Communication Delay Time Checking Processing and Disposition Determination)

Figure 17:
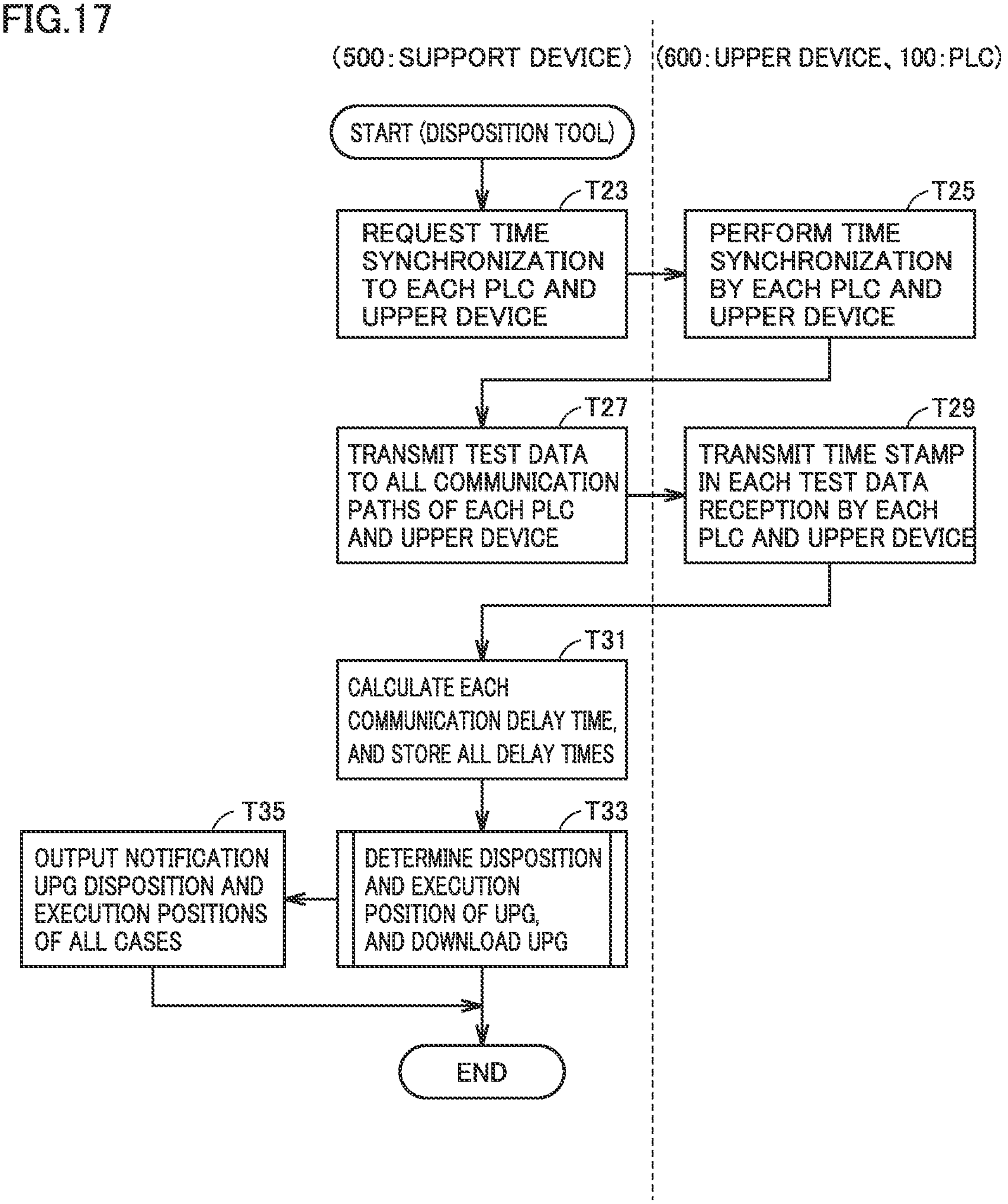
FIG. 17 is a flowchart illustrating an example of processing for measuring a communication delay time between devices of the embodiment.
Figure 18:
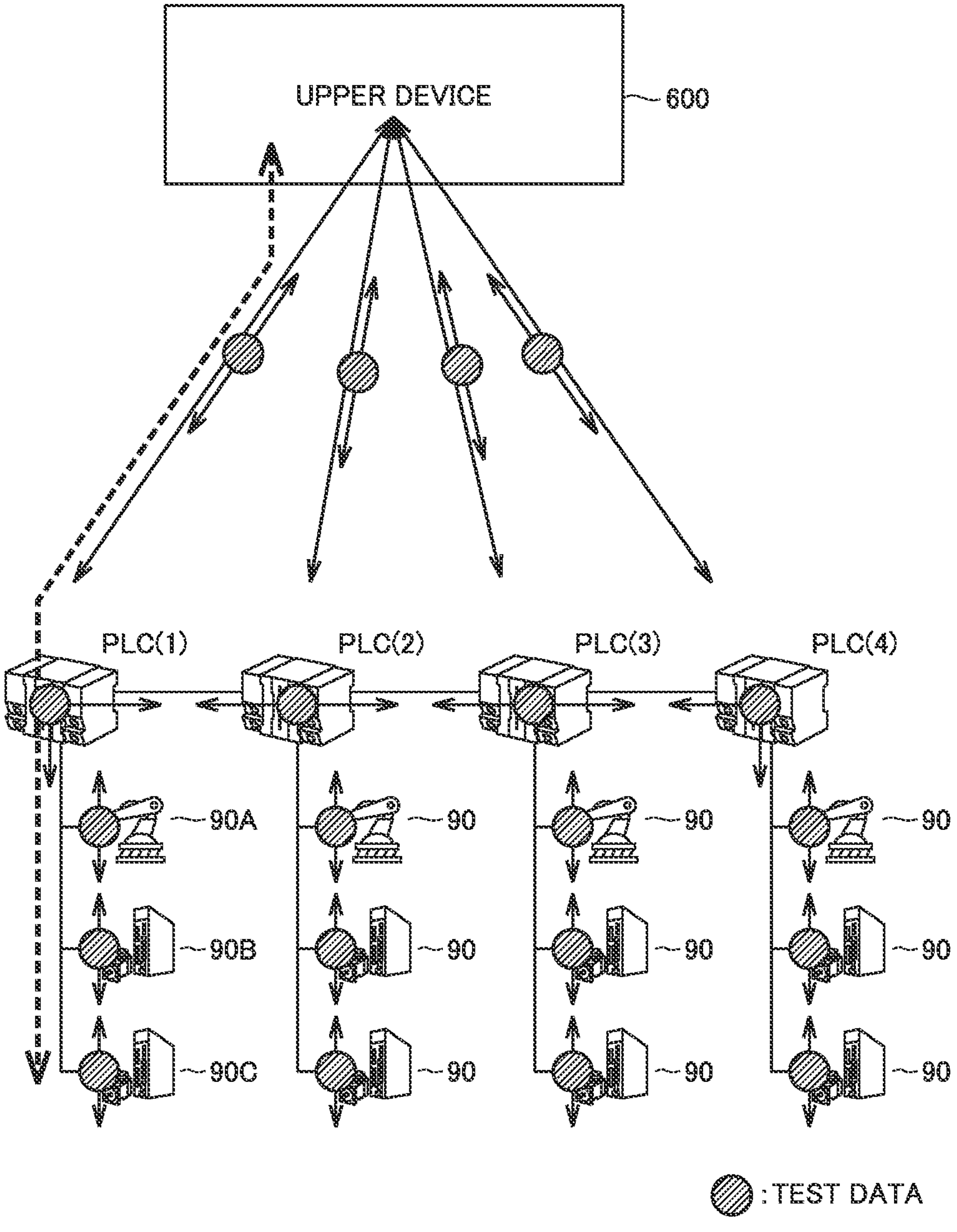
FIG. 18 is a view schematically illustrating a transmission path of test data when the communication delay time between devices is measured in the embodiment.

FIG. 17 is a flowchart illustrating an example of processing for measuring the communication delay time between the devices of the embodiment. FIG. 18 is a view schematically illustrating a transmission path of test data when the communication delay time between the devices is measured in the embodiment. Referring to FIG. 17, the processing in which delay calculation processing unit 525 measures the communication delay time between the devices will be described.

Delay calculation processing unit 525 transmits the request data requesting the execution of the time synchronization to each PLC 100 and upper device 600 through communication processing unit 526 (step T23).

In upper device 600 and each PLC 100, delay measurement processing unit 613 causes time synchronization processing unit 618 to execute the time synchronization processing in accordance with the request data received through communication processing unit 615 (step T25). Thus, the devices (upper device 600, PLC 100, and field device 90) are time-synchronized with each other.

In the embodiment, the time synchronization is performed in response to the time synchronization request from support device 500 (delay calculation processing unit 525), but the time synchronization method is not limited thereto. For example, depending on a time synchronization protocol, the devices can perform the time synchronization with each other without the request, and in the embodiment, such time synchronization without the request may be performed.

After transmitting the time synchronization request data, delay calculation processing unit 525 transmits test data to each PLC 100 and upper device 600 through communication processing unit 526 (step T27). Using the test data received from delay calculation processing unit 525 of support device 500, delay measurement processing units 613 of each PLC 100 and upper device 600 collect a time stamp that is the time output by the timer of the device from each device on network 11 (step T29). Delay measurement processing units 613 of each PLC 100 and upper device 600 transmit the collected time stamp to support device 500. Details of the time stamp collection will be described later.

Delay calculation processing unit 525 calculates delay times 532 of all the communication paths, which are the communication delay time between the devices, from the time stamps received from PLCs 100 and upper device 600, and stores calculated delay times 532 of all the communication paths in RAM 504 (step T31).

Determination processing unit 523 determines the device (PLC 100 or the upper device 600) in which each UPG 69 is to be disposed based on UPG required memory 530, secured memory 531 of each device, delay times 532 of all the communication paths, and execution time 533 of each UPG (step T33). At this time, support device 500 may download each UPG 69 to the determined device. The processing of step T33 can be executed for each of patterns 1 to 6 in FIG. 12, and details will be described later.

Disposition tool 630 outputs or stores the notification of UPG disposition information 627 indicating the disposition determination acquired in step T33 through UI 520 (step T35).

In steps T33 and T35 described above, disposition tool 630 can calculate the information about the device in which each UPG 69 is to be disposed and the device in which UPG 69 is to be executed for each of normal and abnormal patterns described later, and store the calculated information as UPG disposition information 627. In step T35, disposition tool 630 outputs UPG disposition information 627 to display 510 through UI 520. The user can search the information about the pattern corresponding to the state (normal or abnormal) of control system 1 from previously-stored UPG disposition information 627, and dispose (download) UPG 69 in the device based on the searched information, or cause the device based on the searched information to execute UPG 69.

(f3. Time Stamp Collection of Delay Measurement Processing Unit 613)

Referring to FIG. 18, processing for collecting the time stamp (time data) executed by delay measurement processing unit 613 will be described. In FIG. 18, field device 90 of field device group 3A of PLC (1) will be described separately from field devices 90A, 90B, and 90C. For example, delay measurement processing unit 613 conducts end-to-end (E2E) data communication in order to collect the time stamp according to the test data received from support device 500. The communication method for collecting the time stamp is not limited to E2E.

First, delay measurement processing unit 613 of PLC (1) in FIG. 18 generates a plurality of communication frames 20 in which time data of timer 16 of the own device is stored in payload 26. The plurality of communication frames 20 include communication frame 20 addressed to each of field devices 90A, 90B, and 90C of field device group 3A and communication frame 20 addressed to each of PLC (2), PLC (3), PLC (4), and upper device 600. Each of these communication frames 20 stores the time data output by timer 160 of PLC (1) in payload 26, and the identifiers of PLC (1) and the destination device are allocated to the transmission source (TALKER) and the transmission destination (LISTENER) of stream ID 29.

PLC (1) transmits these communication frames 20 onto network 11. Each device determines whether communication frame 20 is addressed to the device itself based on stream ID 29 of the communication frame 20. When it is determined that communication frame 20 is addressed to the own device, the time data of the timer of the own device is stored in payload 26, and communication frame 20 is transmitted to the transmission source (PLC (1)). When it is not determined that communication frame 20 is addressed to the own device, communication frame 20 is allowed to pass. As a result, PLC (1) can receive communication frame 20 transferred between PLCs 100, between PLC (1) and field device 90A, between the devices of field devices 90A, 90B, and 90C, and between PLC (1) and upper device 600. PLC (1) transmits communication frame 20 received from each device to support device 500.

Delay measurement processing unit 613 of PLC (2) generates and transmits a plurality of communication frames 20 in which the time data of timer 16 of the own device is stored in payload 26, namely, communication frame 20 addressed to each field device 90 of field device group 3B and communication frame 20 addressed to each upper device 600. Each device stores the time data of the timer in communication frame 20 of the own device in payload 26, and transmits communication frame 20 to the transmission source (PLC (2)). Thus, PLC (2) can receive communication frame 20 transferred between PLC (2) and field device 90, between field devices 90 of field device group 3B, and between PLC (2) and upper device 600. PLC (2) transmits communication frame 20 received from each device to support device 500.

Similarly to PLC (2), delay measurement processing units 613 of PLC (3) and PLC (4) transmit communication frame 20 in which the time data is stored from each device to support device 500 using communication frame 20 addressed to each of field device 90 of field device group 3C and upper device 600. As a result, PLC (3) can receive and transfer communication frame 20 transferred between PLC (3) and field device 90, between the field devices, and between PLC (3) and upper device 600 to support device 500. PLC (4) can receive and transfer communication frame 20 transferred between PLC (4) and field device 90, between the field devices, and between PLC (4) and upper device 600 to support device 500.

Delay calculation processing unit 525 of support device 500 collects the time stamp from the time data of payload 26 of communication frame 20 received from PLCs (1) to (4), calculates the communication delay time between the devices from the collected time stamp, and stores the calculated communication delay time in RAM 504 as delay times 532 of all communication paths. The method for collecting the time stamp is an example, and the present invention is not limited thereto.

(f4. Disposition Determination of Pattern 1)

Figures 19, 20:
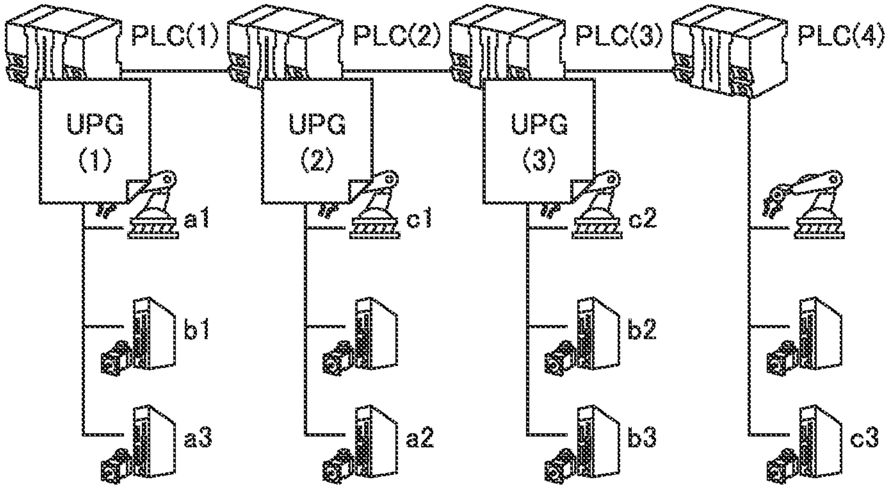
FIG. 19 is a view illustrating an example of information referred to by a determination processing unit 523 of the embodiment for the purpose of the disposition determination.
FIG. 20 is a view schematically illustrating an example of disposition of UPGs according to pattern 1 of the embodiment.

First, information referred to in the disposition determination processing will be described. FIG. 19 is a view illustrating an example of the information referred to by determination processing unit 523 of the embodiment for the purpose of the disposition determination. FIG. 20 is a view schematically illustrating an example of the disposition of the UPGs according to a pattern 1 of the embodiment. Referring to FIG. 19, the information includes UPG execution time 533 and at least one variable 314 referred to in UPG 69 corresponding to each of UPGs (1) to (3) that are the disposition target. Variable 314 is an input variable used in corresponding UPG 69, and for example, can be extracted from the program code of UPG 69. FIG. 20 illustrates specific field device 90 that outputs the field value set to the variable used by each UPG 69 in FIG. 19.

Figure 21:
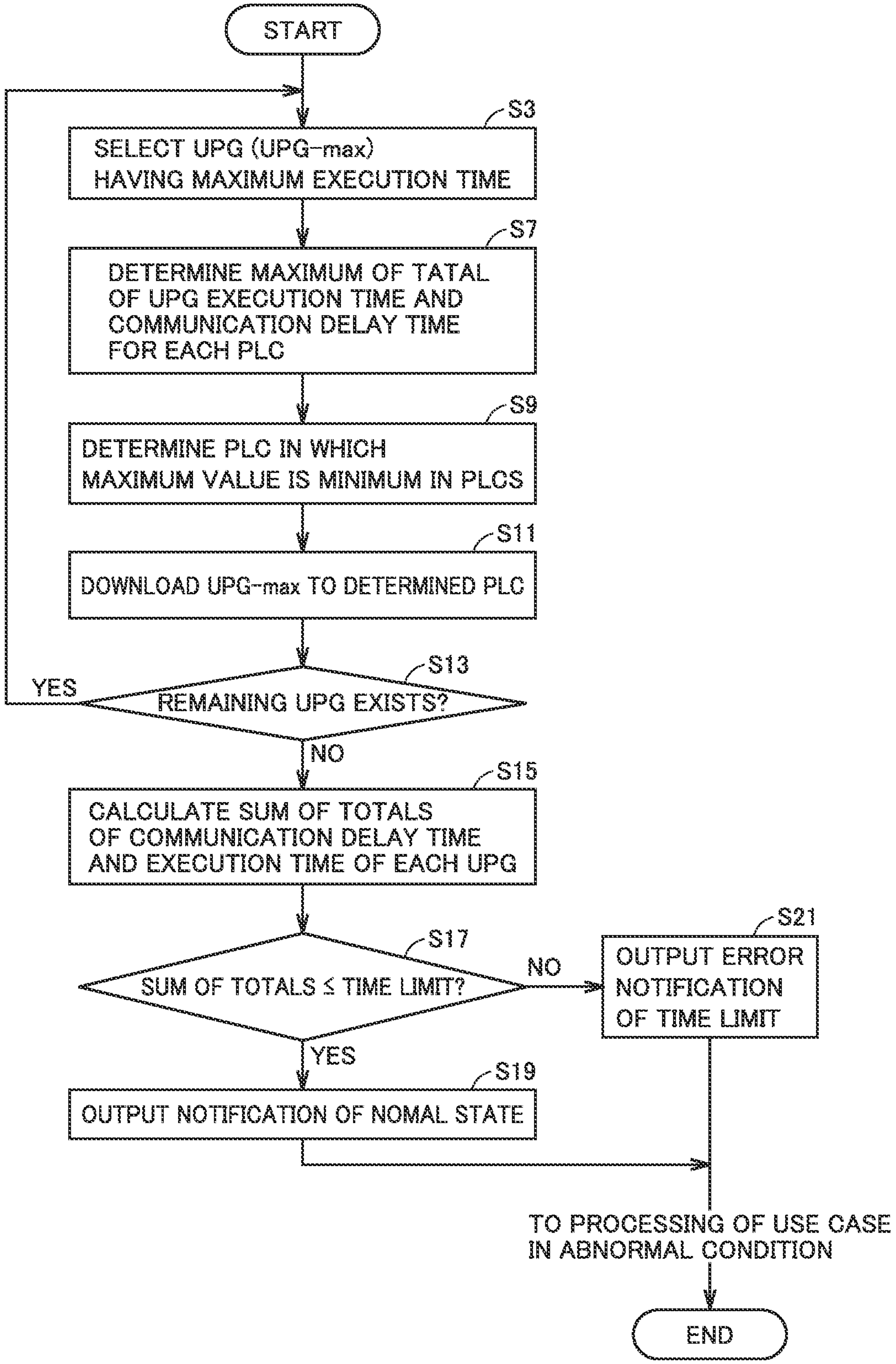
FIG. 21 is a flowchart illustrating an example of disposition determination processing according to pattern 1 of the embodiment.

FIG. 21 is a flowchart illustrating an example of disposition determination processing according to pattern 1 of the embodiment. Determination processing unit 523 selects the UPG (in this case, referred to as UPG-max) having maximum UPG execution time 533 in UPGs (1) to (3) of UPG library 172 (step S3).

For example, for UPG execution time 533 in FIG. 19, the determination processing unit 523 selects UPG (3) as UPG-max according to (t1<t2<t3) (step S3).

Determination processing unit 523 determines the maximum value of the total of the communication delay time of variable 314 of UPG-max and UPG execution time 533 in each of PLCs (1) to (4) (step S7). The communication delay time of variable 314 corresponds to the required time of IO refresh 72 when the UPG-max is executed by PLC 100. According to delay time 532 of all the communication paths, for example, it is assumed that the time during which the data is transmitted (passed) through PLC 100, namely, the communication delay time between PLCs 100 is 0.3 msec, and that the communication delay time between PLC 100 and field device 90 or between field devices 90 is 0.1 msec. For example, UPG execution time 533 in each of PLCs (1) to (4) is uniformly 0.5 msec. In the embodiment, the communication delay time between the devices includes the communication delay time of the input data (data of variable 314) used by UPG 69. Accordingly, the total of the communication delay time of variable 314 of the UPG-max and UPG execution time 533 is the time required for IO refresh 72 and the UPG execution when the UPG-max is executed. The communication delay time between the devices includes the communication delay time of the input data used by the control program.

When UPG-max is downloaded to PLC (1), the total of variables a3, b3, and c3 of UPG (3) is a3: 0.8 msec, b3: 1.4 msec, and c3: 1.7 msec, respectively, and thus the maximum value of 1.7 msec is extracted.

When UPG-max is downloaded to PLC (2), the total of the variables a3, b3, and c3 of UPG (3) is a3: 1.1 msec, b3: 1.1 msec, and c3: 1.7 msec, respectively, and thus the maximum value of 1.7 msec is extracted.

When UPG-max is downloaded to PLC (3), the total of the variables a3, b3, and c3 of UPG (3) is a3: 1.7 msec, b3: 0.8 msec, and c3: 1.4 msec, respectively, and thus the maximum value of 1.7 msec is extracted.

When UPG-max is downloaded to PLC (4), the total of the variables a3, b3, and c3 of UPG (3) is a3: 2.0 msec, b3: 1.4 msec, and c3: 0.8 msec, respectively, and thus the maximum value of 2.0 msec is extracted.

Determination processing unit 523 determines corresponding PLC 100 having the smallest value among the maximum values of the totals corresponding to PLCs 100 extracted in step S7 (step S9). Determination processing unit 523 downloads UPG-max to determined PLC 100 (step S11).

When the plurality of PLCs 100 are determined in step S9, determination processing unit 523 selects the larger size of secured memory 531 as the download destination of UPG-max.

Determination processing unit 523 determines whether there is what is called remaining UPG 69 on which the pieces of processing in steps S3 to S11 are not executed among UPGs (1) to (3) (step S13). When determining that there is remaining UPG 69 (YES in step S13), the determination processing unit 523 returns to step S3 and executes the processing in and after step S3 on remaining UPG 69. When determining that there is no remaining UPG 69 (NO in step S13), determination processing unit 523 proceeds to step S15.

For each of UPGs (1) to (3), determination processing unit 523 calculates the total of the execution time of the UPG in determined PLC 100 and the communication delay time (IO refresh time) of the variable, and calculates the sum of the totals (step S15).

Determination processing unit 523 compares execution time limit 315 set by the user in step T1 with the sum of the respective totals of UPGs (1) to (3) calculated in step S15, and determines whether the condition of (sum of totals<execution time limit 315) is satisfied based on the comparison result (step S17).

When it is determined that the condition of (sum of totals<execution time limit 315) is satisfied (YES in step S17), determination processing unit 523 outputs the notification indicating that the disposition is normally determined through UI 520 (step S19). When determining that the condition is not satisfied (NO in step S17), determination processing unit 523 outputs the error notification of the execution time limit through UI 520 (step S21). For example, FIG. 20 illustrates the determination that UPGs (1) to (3) are disposed in PLCs (1) to (3), respectively.

As described above, in pattern 1, when control system 1 cannot provide the execution environment of UPG 69 by upper device 600, disposition tool 630 can determine UPG 100 in which UPG 69 is to be disposed from PLCs (1) to (4) based on the communication delay time and the resource including the storage area size usable for the execution of UPG 69 of PLCs (1) to (4) and the execution time for each of UPGs (1) to (3).

(f5. Disposition Determination of Pattern 2)

Figure 22:
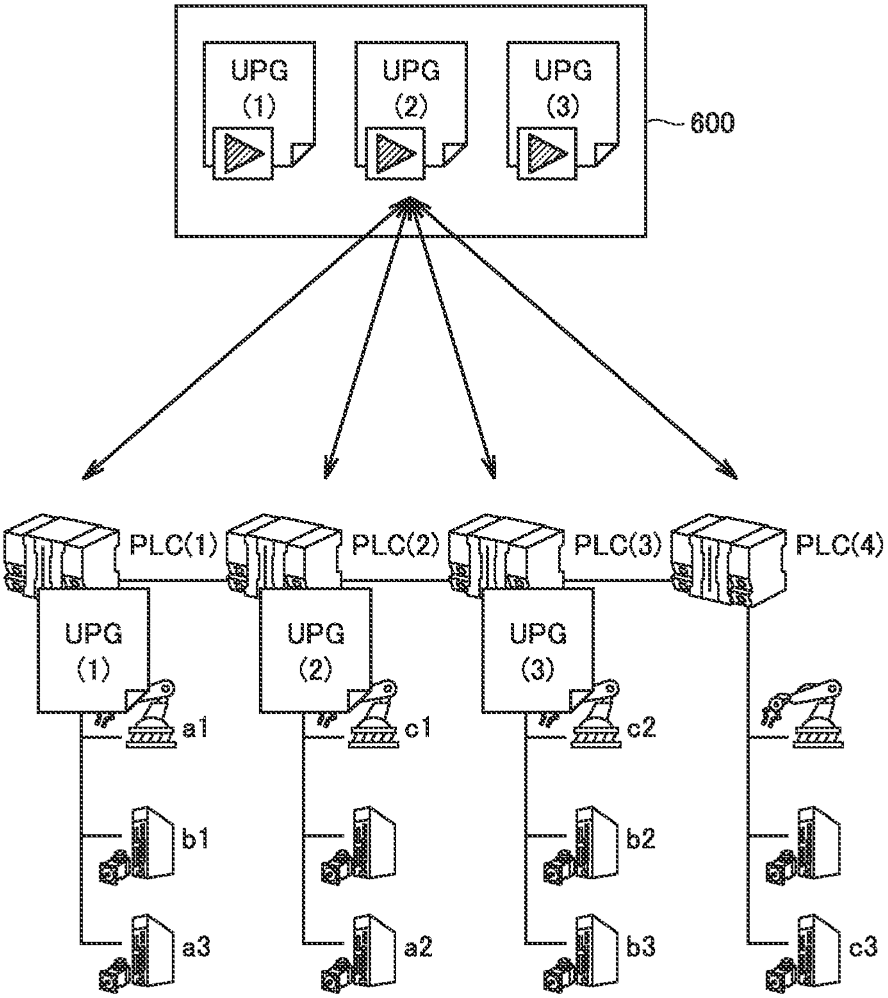
FIG. 22 is a view schematically illustrating an example of the disposition of the UPGs according to pattern 2 of the embodiment.

FIG. 22 is a view schematically illustrating an example of the disposition of the UPGs according to a pattern 2 of the embodiment. In pattern 2, upper device 600 can be included as a candidate for the disposition destination of UPG 69.

In pattern 1, the device in which the disposition of UPG 69 is determined by determination processing unit 523 is automatically determined as the device on which UPG 69 is to be executed. On the other hand, in pattern 2, upper device 600 that provides the environment in which secured memory 531 is larger and UPG execution time 533 is shorter than that of PLC 100, namely, UPG 69 can be executed at a high speed can be determined as the device of the disposition destination or the device that executes UPG 69, and control system 1 can be operated with high performance.

Figure 23:
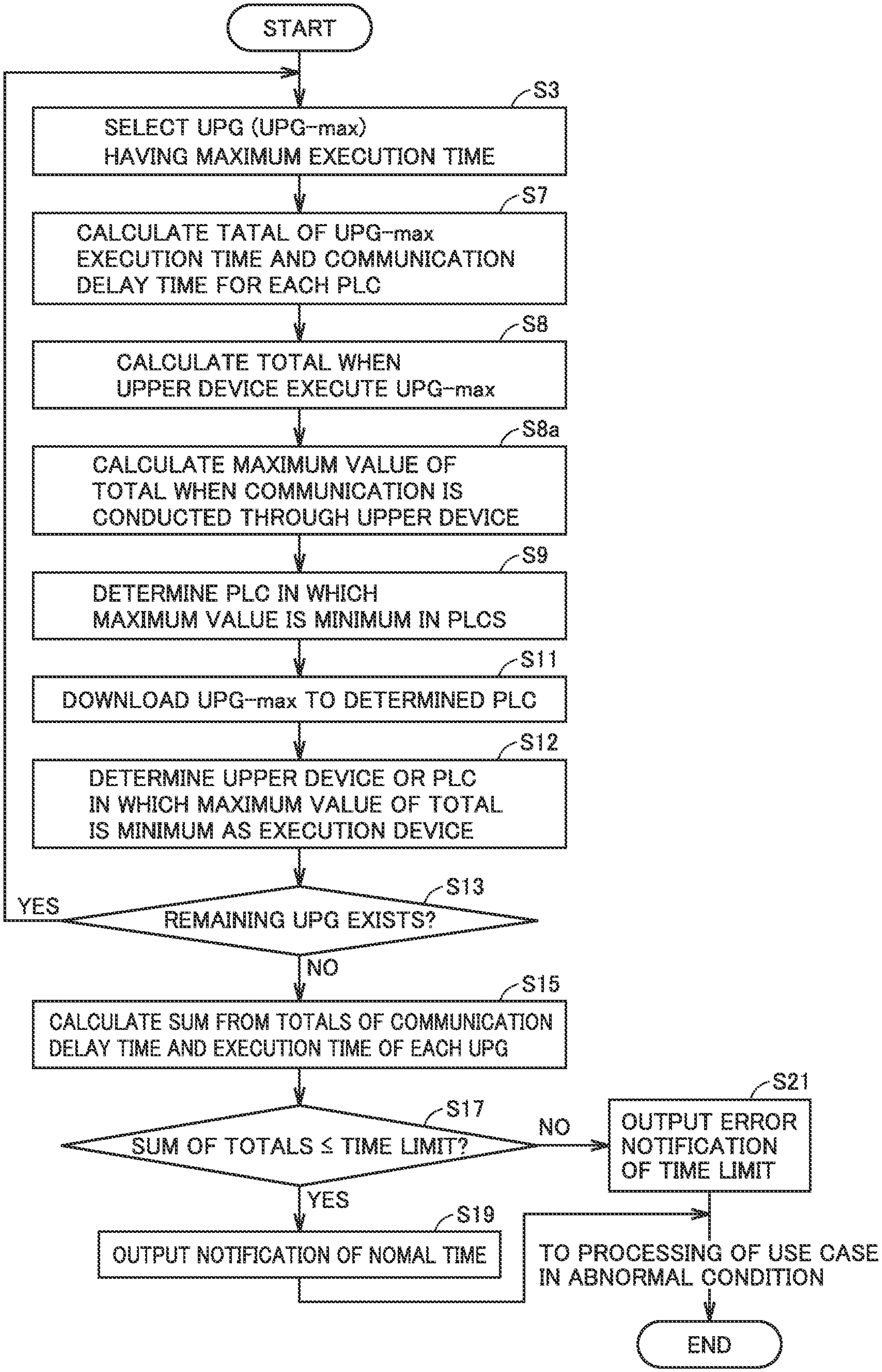
FIG. 23 is a flowchart illustrating an example of the disposition determination processing according to pattern 2 of the embodiment.

In FIG. 22, the size of secured memory 531 is extremely larger than that of PLCs (1) to (4), so that UPGs (1) to (3) can be disposed in upper device 600. The disposition of UPGs (1) to (3) in PLCs (1) to (4) can be determined similarly to FIG. 21. FIG. 23 is a flowchart illustrating an example of the disposition determination processing according to pattern 2 of the embodiment. In the processing of FIG. 23, the processing for determining the device that executes UPG 69 from upper device 600 and PLCs (1) to (4) is executed in steps S3 to S12 of FIG. 23. According to delay time 532 of all the communication paths, for example, the communication delay time between PLCs 100 is 0.3 msec, the communication delay time between PLC 100 and field device 90 or between field devices 90 is 0.1 msec, and the communication delay time between each PLC 100 and upper device 600 is 0.4 msec. For example, UPG execution time 533 in each of PLCs (1) to (4) is uniformly 0.5 msec and UPG execution time 533 of upper device 600 is 0.3 msec.

First, determination processing unit 523 selects UPG-max (step S3), and calculates the total of the execution time and the communication delay time when UPG-max is executed for each of PLC (1) to PLC (4) (step S7). Similarly to pattern 1, 1.7 msec, 1.7 msec, 1.7 msec, and 2.0 msec are calculated as the maximum value of the total for each of PLC (1) to PLC (4).

When the UPG-max is executed by upper device 600, the total of variables a3, b3, and c3 of UPG (3) is a3: 1.3 msec, b3: 1.3 msec, and c3: 1.3 msec, respectively, and thus determination processing unit 523 calculates the maximum value 1.3 msec among them (step S8).

In pattern 2, determination processing unit 523 also calculates the maximum value of the totals when each PLC 100 communicates the variable through upper device 600 (step S8*a*). That is, by adding (a reciprocating communication time (0.4×2) msec) between each PLC 100 and upper device 600) to the communication delay time, for example, when the UPG-max (UPG (3)) is downloaded to PLC (1), the total of variables a3, b3, and c3 of UPG (3) is a3: 0.8 msec, b3: 1.9 msec, and c3: 1.9 msec, respectively, and thus the maximum value of 1.9 msec is extracted. When the cases of PLC (2) and PLC (3) are calculated in the same manner, the maximum value is 1.9 msec in both cases.

Determination processing unit 523 determines corresponding PLC 100 having the smallest value among the maximum values of the totals corresponding to PLCs 100 calculated in steps S7 and step S8*a* (step S9). Similarly to pattern 1, determination processing unit 523 downloads the UPG-max to determined PLC 100 (step S11).

Determination processing unit 523 determines the device having the minimum total maximum value among upper device 600 and PLCs (1) to (4) as the execution device that executes the UPG-max (step S12). Determination processing unit 523 executes the processing in and after step S13 similarly to pattern 1.

In pattern 2, determination processing unit 523 can determine PLC 100 or upper device 600 as the disposition destination of UPGs (1) to (3), and determines the execution device of UPGs (1) to (3) as upper device 600. That is, when the communication delay time (0.4 msec) between each of PLCs (1) to (4) and upper device 600 is sufficiently short as in pattern 2, the execution time (0.3 msec) in upper device 600 is shorter than the execution time (0.5 msec) of PLC 100, and the size of secured memory 531 of upper device 600 is extremely large as compared with PLCs (1) to (4). For this reason, in step S12, for example, upper device 600 can be determined as the execution device from upper device 600 and PLCs (1) to (4) that are the disposition destinations of UPGs (1) to (3).

Because the pieces of processing of steps S13 to S21 is similar to the corresponding pieces of processing in FIG. 21, the description will not be repeated.

As described above, UPG 69 is executed in upper device 600, so that control system 1 can be operated with high performance as compared with the case of being executed by PLC 100.

(f6. Disposition Determination of Pattern 3)

Figure 24:
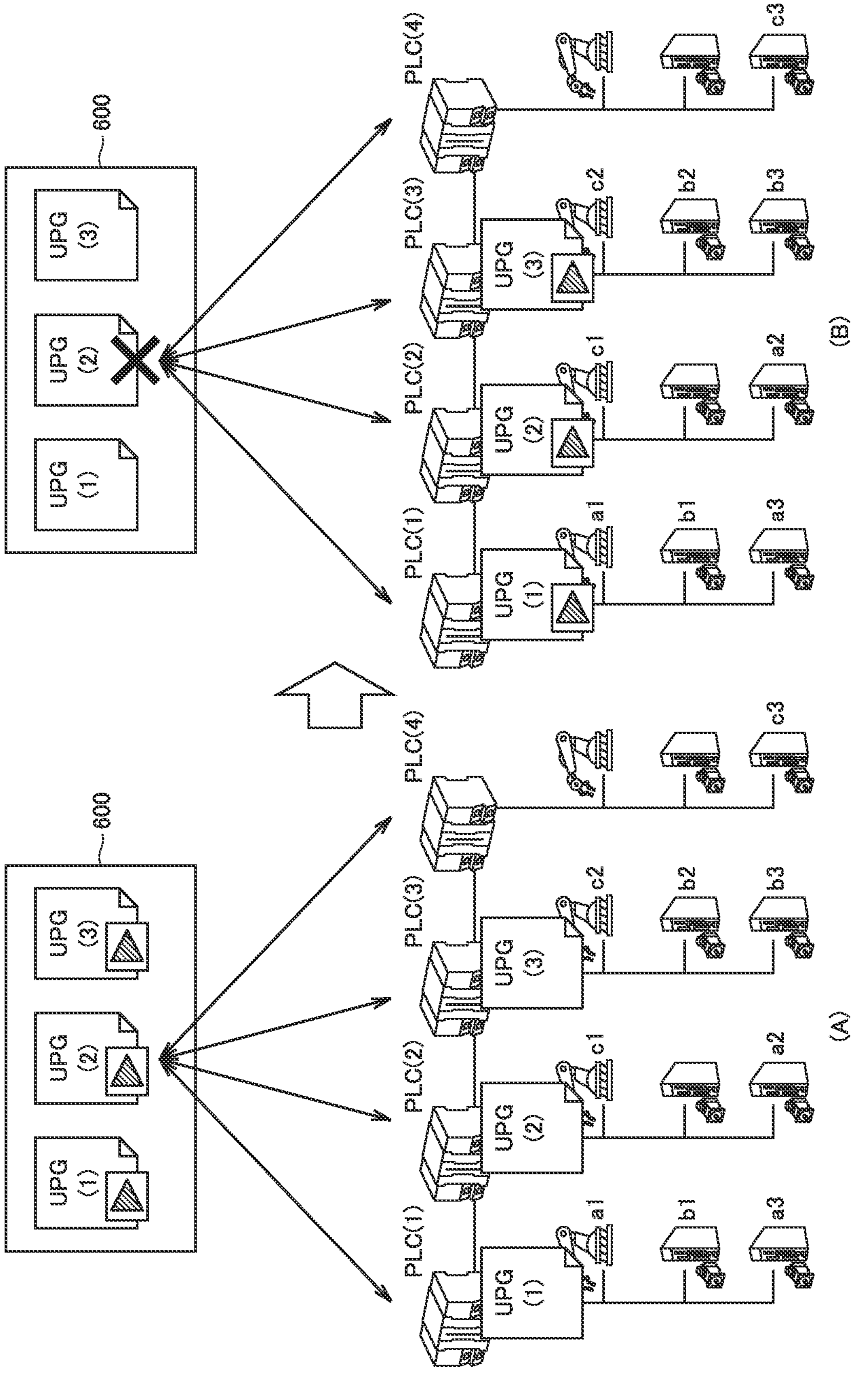
FIG. 24 is a view schematically illustrating an example of the disposition of the UPGs according to pattern 3 of the embodiment.

FIG. 24 is a view schematically illustrating an example of the disposition of UPGs according to a pattern 3 of the embodiment. Pattern 3 indicates a failure mode in which an abnormality such as disconnection of communication between upper device 600 and PLC 100 is detected in the case where the disposition of UPGs (1) to (3) is determined in pattern 2 (part (A) in FIG. 24). For example, this failure mode corresponds to the state in which PLCs 100 (1) to (4) cannot receive the control data (output data (reception) 183 in FIG. 11) that is the execution result of UPG (1) to UPG (3) executed by upper device 600 in FIG. 11.

Disposition tool 630 determines the disposition of the UPG corresponding to pattern 3 of the failure mode, and calculates UPG disposition information 627 (part (B) in FIG. 24). The disposition determination processing executed in pattern 3 is processing related to variable communication and processing using the communication delay time in the communication path not passing through upper device 600, and is similar to the processing in FIG. 21 indicated by pattern 1, and thus the description thereof will not be repeated.

As described above, when PLC 100 cannot receive the execution result (control data) of UPG 69 from upper device 600 from the disposition determination state of pattern 2, the redisposition of determining the execution device of UPG 69 is performed such that the control data can be calculated on the side of PLC 100 independently of upper device 600 according to UPG disposition information 627 of pattern 3, whereby the operation of control system 1 can be continued.

(f7. Disposition Determination of Pattern 4)

Figure 25:
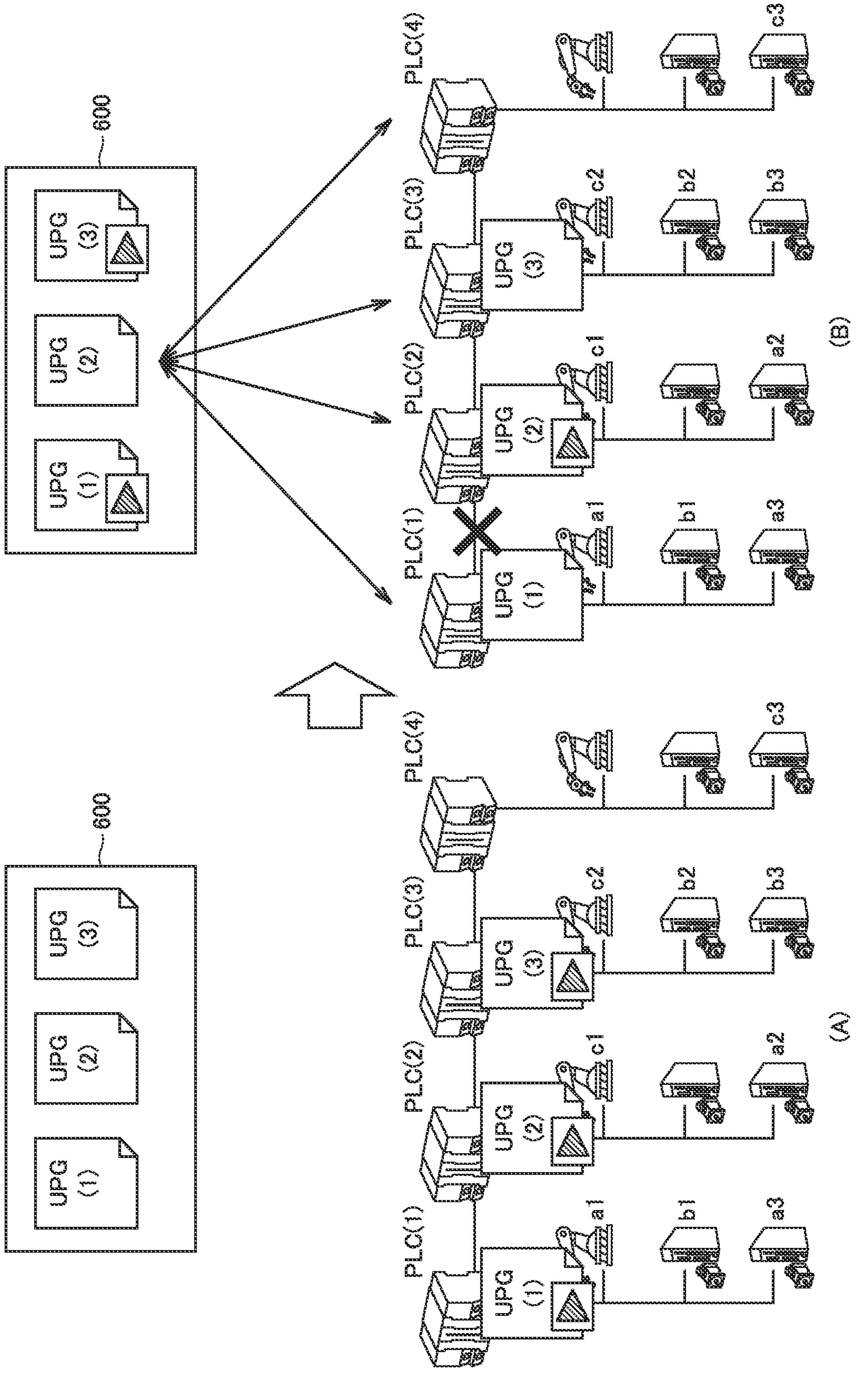
FIG. 25 is a view schematically illustrating an example of the disposition of the UPGs according to pattern 4 of the embodiment.

FIG. 25 is a view schematically illustrating an example of the disposition of UPGs according to a pattern 4 of the embodiment. Pattern 4 is a case where the communication delay time not using the communication path passing through upper device 600 is shorter than the communication delay time of the communication path passing through upper device 600 in the state where UPGs (1) to (3) are disposed in upper device 600 and also disposed in PLCs (1) to (3). Accordingly, as illustrated in a part (A) of FIG. 25, the execution devices of UPGs (1) to (3) are determined as PLCs (1) to (3), respectively. In part (A) of FIG. 25, for the state in which the communication is interrupted due to the generation of an abnormality in network 11 between PLC (1) and PLC (2), disposition tool 630 calculates UPG disposition information 627 corresponding to pattern 4 of the failure mode.

For pattern 4 of the failure mode, determination processing unit 523 of disposition tool 630 calculates the communication delay time not using the communication path between PLC (1) and PLC (2), namely, using the communication path passing through upper device 600. For example, disposition determination processing according to pattern 2 is executed. Thus, for example, determination processing unit 523 determines the execution devices of UPG (1) and UPG (3) as upper device 600, and calculates UPG disposition information 627 indicating that UPG (2) is disposed and executed in PLC (2) (a part (B) in FIG. 25).

As described above, in the case where PLC 100 is determined to be the execution device of UPG 69 while UPG 69 is disposed in upper device 600, when the abnormality occurs in the communication path between PLCs 100, the operation of control system 1 can be continued by switching the execution device from PLC 100 to upper device 600 according to UPG disposition information 627 of pattern 4.

(f8. Disposition Determination of Pattern 5)

Figure 26:
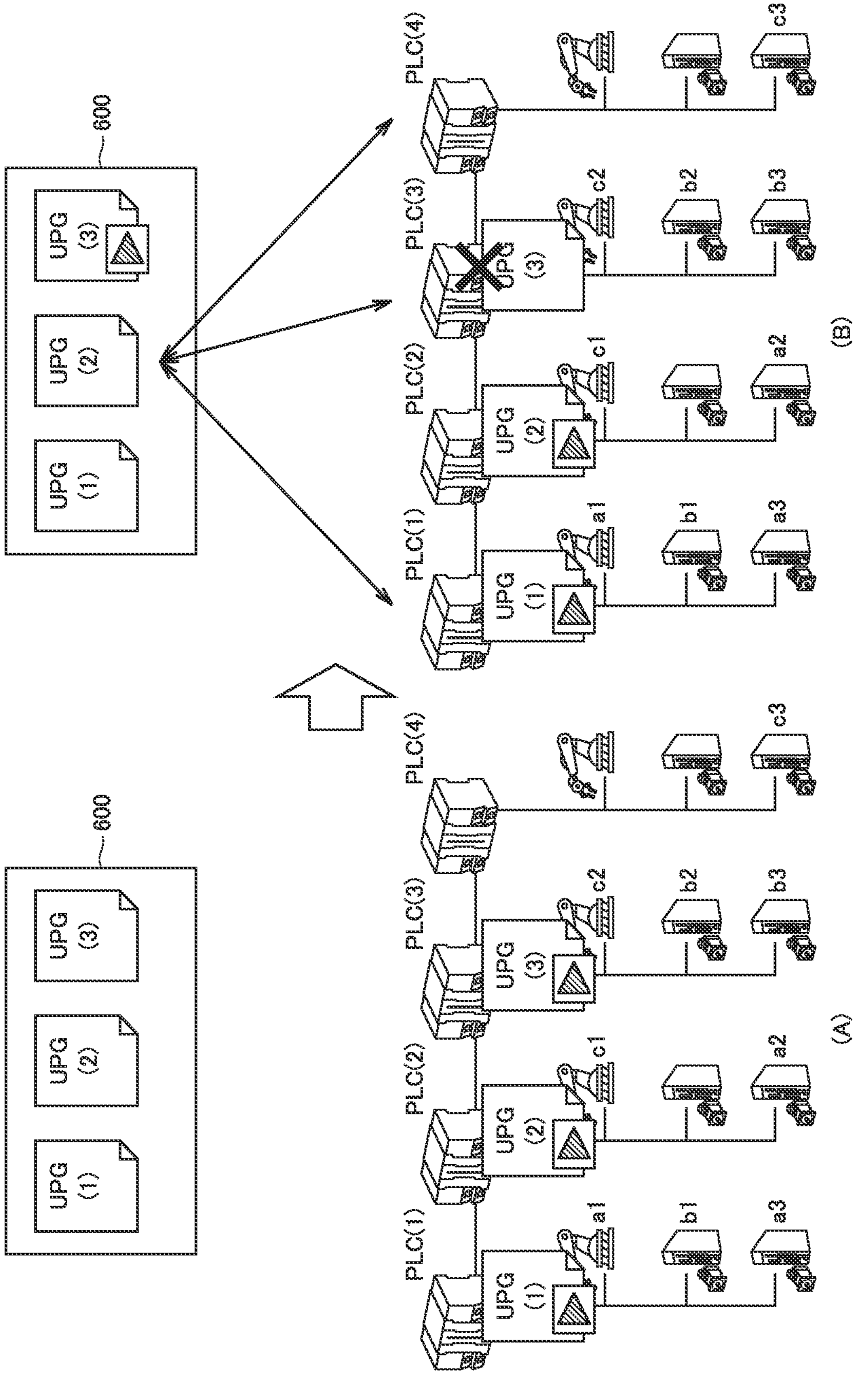
FIG. 26 is a view schematically illustrating an example of the disposition of the UPGs according to pattern 5 of the embodiment.

FIG. 26 is a view schematically illustrating an example of the disposition of the UPGs according to a pattern 5 of the embodiment. Pattern 5 indicates the state (for example, failure) in which PLC (3) cannot execute UPG 69 as illustrated in part (B) of FIG. 26 in the state in which the execution devices of UPGs (1) to (3) in part (A) of FIG. 26 are determined as PLCs (1) to (3).

Disposition tool 630 calculates UPG disposition information 627 corresponding to pattern 5 of the failure mode in which the abnormality is detected.

Similarly to the processing of pattern 2, determination processing unit 523 of disposition tool 630 executes the disposition determination processing on PLC (1), PLC (2), PLC (4), and upper device 600 excluding failed PLC (3). Thus, for example, UPG disposition information 627 switching the execution apparatus of UPG (3) from PLC (3) to upper device 600 can be calculated as illustrated in part (B) of FIG. 26.

As described above, in the case where PLC 100 is determined to be the execution device of UPG 69, when PLC 100 becomes inexecutable because the abnormality (failure or the like) is generated in PLC 100, the operation of control system 1 can be continued by switching the execution device from PLC 100 to upper device 600 according to UPG disposition information 627 corresponding to pattern 5.

(f9. Disposition Determination of Pattern 6)

Figure 27:
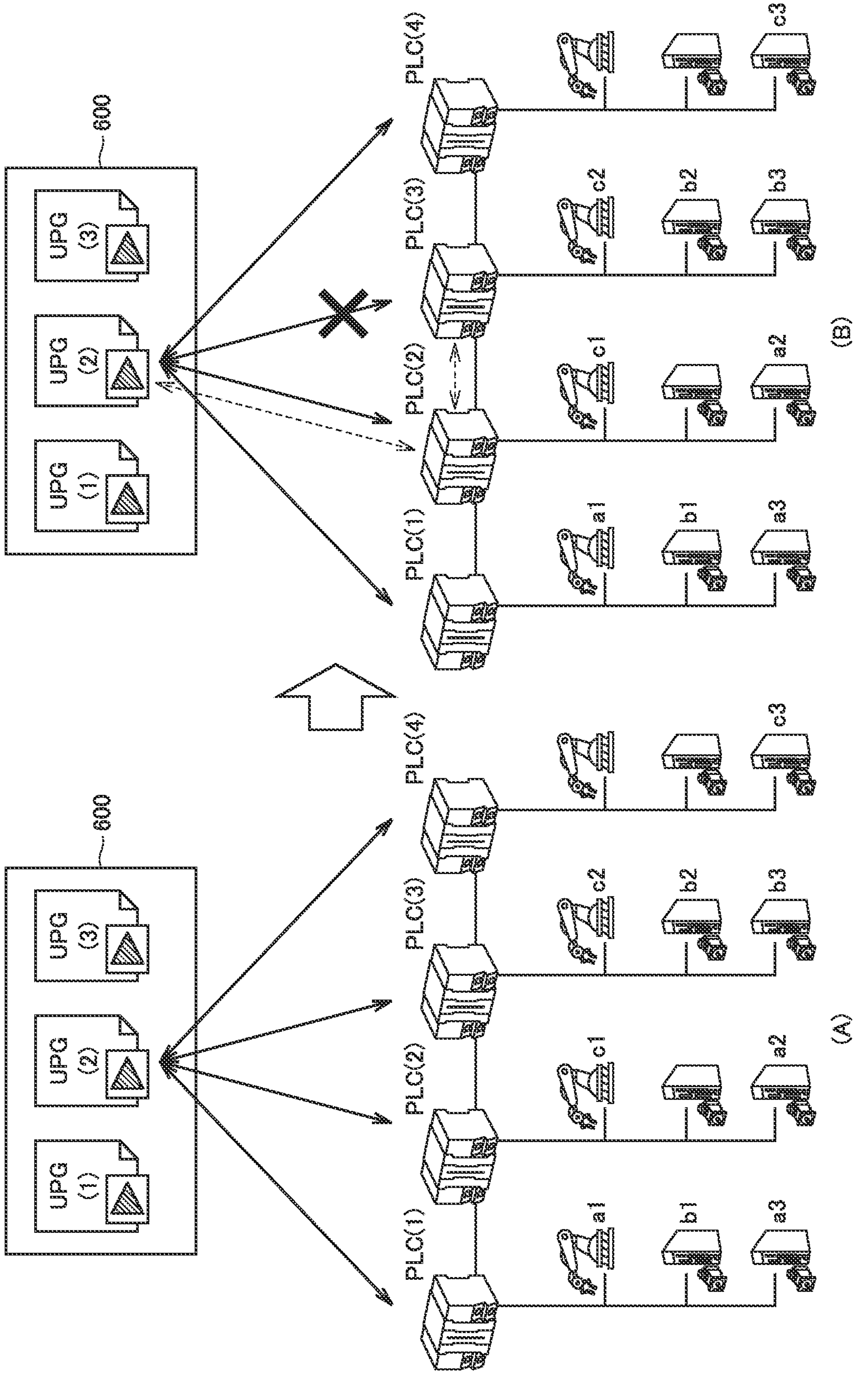
FIG. 27 is a view schematically illustrating an example of the disposition of the UPGs according to pattern 6 of the embodiment.

FIG. 27 is a view schematically illustrating an example of the disposition of the UPGs according to a pattern 6 of the embodiment. Pattern 6 illustrates the failure mode of the abnormal condition in which the communication path between PLC (3) and upper device 600 is disconnected as illustrated in part (B) of FIG. 27 when the execution devices of UPGs (1) to (3) are upper device 600 as illustrated in part (A) of FIG. 27. For example, part (A) of FIG. 27 illustrates the case where upper device 600 is determined again as the execution device of UPG (1) to (3) in the disposition determination processing of pattern 2.

In accordance with the notification of pattern 6, determination processing unit 523 of disposition tool 630 performs the disposition determination of UPGs (1) to (3) in the same procedure as the processing of pattern 2 using the communication delay time not passing through the communication path between PLC (3) and upper device 600, thereby calculating UPG disposition information 627 corresponding to pattern 6. For example, according to UPG disposition information 627 corresponding to pattern 6, the execution apparatus of UPGs (1) to (3) can be determined again as upper device 600.

G. Program

Although the configuration example in which processor 112, processor 603, and CPU 502 execute the program to provide the necessary functions has been described in FIGS. 2, 4, and 5, a part or all of these provided functions may be implemented using a dedicated hardware circuit (for example, an application specific integrated circuit (ASIC) and a field-programmable gate array (FPGA)). Alternatively, the main part of control device 100 may be implemented using hardware (for example, an industrial personal computer based on a general-purpose personal computer) according to a general-purpose architecture. In this case, an environment including a multiprocessor and executable in parallel is provided. In this case, a plurality of operating systems (OSs) having different uses may be executed in parallel using a virtualization technology, and the necessary application may be executed on each OS.

Processor 112 or processor 603 executes the necessary program, so that each unit in FIG. 8 may execute the above processing. The program may be stored in the storage unit (storage 119 or HDD 606). When processor 112 or processor 603 executes the necessary program, the target program stored in the storage unit is expanded in the RAM. Then, processor 112 or processor 603 interprets and executes the program expanded in the RAM to control each component.

In addition, CPU 502 executes the necessary program, so that each unit in FIG. 9 may execute the above processing. The program may be stored in the storage unit (HDD 505). When CPU 502 executes the necessary program, the target program stored in the storage unit is deployed in the RAM. Then, CPU 502 interprets and executes the program deployed in the RAM to control each component.

For example, the above storage unit is an auxiliary storage device such as the HDD or the SSD, and stores the programs and data in FIGS. 2, 4, and 5 executed by the processor or the CPU.

Memory cards 116, 621 and storage medium 501 are a medium that accumulates information such as the program by electrical, magnetic, optical, mechanical, or chemical action such that a computer, other devices, a machine, or the like can read the information such as the recorded program. PLC 100, upper device 600, and support device 500 may acquire the program and/or the data stored in the storage unit from memory cards 116, 621 and storage medium 501.

H. Appendix

The above embodiment includes the following technical ideas.

[Configuration 1] A control system (1) including a control target (90) and a plurality of devices (100, 600), the control target and the plurality of devices being connected to a network (11), the control system including:

- program storage (119, 606) provided in each device storing a control program (69) calculating control data using data exchanged with a control target;
- execution module configured to cause a processor (112, 603) to execute a plurality of programs including disposed control program, the execution module being included in each device; and
- disposition module (630) configured to dispose a plurality of control programs in at least one of the plurality of devices,
- wherein the disposition module determines a device in which the control program is disposed from among the plurality of devices based on a communication delay time (631) between the devices and information (632) about a resource usable for execution of the control program of each device for each control program.

[Configuration 2] The control system according to configuration 1, wherein the information about the resource usable for the execution of the control program of each of the devices includes a size (633) of a storage area usable for the execution of the control program in the program storage.

[Configuration 3] The control system according to configuration 2, wherein the disposition module inquires of each device about the size of the storage area usable for the execution of the control program.

[Configuration 4] The control system according to configuration 1 or 2, wherein the information about the resource usable for the execution of the control program of each of the devices includes a time (533) during which the processor is usable for the execution of the control program.

[Configuration 5] The control system according to configuration 4, wherein the disposition module inquires each device about the time during which the processor is usable for the execution of the control program.

[Configuration 6] The control system according to any one of configurations 1 to 5, further including module (613) configured to measure the communication delay time between the apparatuses.

[Configuration 7] The control system according to any one of configurations 1 to 6, wherein the communication delay time between the devices includes a communication delay time required for communication of data exchanged with the control target.

[Configuration 8] The control system according to any one of configurations 1 to 3, wherein the plurality of devices includes an information processing device (600) and at least one control device (100), the information processing device and at least one control device being time-synchronized with each other, the execution module of the information processing device causes a processor to execute the control program using data received from each of the at least one control device, the execution module of the each control device causes a processor to execute input and output program that transfers data exchanged with the control target to the information processing device and outputs the control data received from the information processing device to the control target, and the control program and the input and output program are executed within a time (10) based on the time synchronization and shared between the each control device and the information processing device.

[Configuration 9] The control system according to any one of configurations 1 to 8, wherein the disposition module determines a device in which the control program is disposed from among the plurality of devices based on the communication delay time between the devices and the information about the resource usable for the execution of the control program of each device for each control program in each failure mode of the control system.

[Configuration 10] The control system according to any one of configurations 1 to 9, wherein the disposition module determines a device that executes the control program from among the devices for which a disposition of the control program is determined (S12).

[Configuration 11] A setting device (500) that performs setting on a control system (1) including a control target (90) and a plurality of devices (100, 600), the control target and the plurality of devices being connected to a network (11), each device including:

program storage (119, 606) storing a control program (69) calculating control data using data exchanged with a control target; and execution module causing a processor (112, 603) to execute a plurality of programs including the disposed control program, the setting device comprising disposition module (630) configured to dispose a plurality of control programs in at least one of the plurality of devices, wherein the disposition module determines a device in which the control program is disposed from among the plurality of devices based on a communication delay time (631) between the devices and information (632) about a resource usable for execution of the control program of each device for each control program.

[Configuration 12] A computer program (61) that performs setting on a control system (1) including a control target (90) and a plurality of devices (100, 600), the control target and the plurality of devices being connected to a network (11), each device including:

program storage (119, 606) storing a control program (69) calculating control data using data exchanged with a control target; and execution module causing a processor (112, 603) to execute a plurality of programs including the disposed control program, the execution module being included in each device, the computer program causes a computer to execute:

acquiring a communication delay time between the devices and information about a resource usable for execution of the control program of each device for each control program; and determining a device in which the control program is disposed from among the plurality of devices based on the communication delay time (631) between the devices and the information (632) about the resource usable for the execution of the control program of each device for each control program.

It should be considered that the disclosed embodiment is an example in all respects and not restrictive. The scope of the present invention is defined by not the above description, but the claims, and it is intended that all modifications within the meaning and scope of the claims are included in the present invention.

REFERENCE SIGNS LIST

1: control system, 3A, 3B, 3C, 3D: field device group, 10: control cycle, 11: network, 12, 13: data storage time, 14: wait time, 16, 99, 101A, 101B, 101C, 101D, 160, 601: timer, 20: communication frame, 21: preamble, 22: destination, 23: transmission source, 24: tag, 25: type, 26: payload, 27: error correction information, 42: flow, 61: disposition program, 62, 96, 116, 622: memory card, 63, 84, 123: scheduler, 64, 83, 127, 611: communication program, 67, 121, 831: time synchronization program, 68: server program, 70, 81, 122, 701: system program, 71: UPG generation program, 72: IO refresh, 73: upper communication, 82: application program, 86: delay time measurement program, 87: memory size calculation program, 88: execution time measurement program, 89: resource measurement program, 90, 90A, 90B, 9090: field device, 91, 112, 603: processor, 110: arithmetic processing unit, 114: storage unit, 119: storage, 120: peripheral processing program, 125: refresh program, 126: measurement program, 134, 944: input data, 135, 943: output data, 162: memory size acquisition program, 163: delay time acquisition program, 170, 171, 172: library, 262: execution time acquisition program, 310: attachment information, 313:

execution limit time of each UPG, 314: variable, 315: execution limit time of all UPGs, 320: resource checking information, 500: support device, 522: execution memory checking processing unit, 523: determination processing unit, 524: required resource calculation processing unit, 525: delay calculation processing unit, 526, 615: communication processing unit, 529: execution time processing unit, 530: UPG required memory, 531: securing memory, 532: delay time, 533, 634: execution time, 600: upper device, 610: scheduling processing unit, 612: ensured memory calculation processing unit, 613: delay measurement processing unit, 614: execution time measurement processing unit, 618: time synchronization processing unit, 627: disposition information, 629: required resource acquisition program, 630: disposition tool, 631: communication delay time, 632: resource amount, 633: storage area size

The invention claimed is:

1. A control system including a control target and a plurality of devices, the control target and the plurality of devices being connected to a network, the control system comprising:

program storage provided in each device and configured to store a control program for calculating control data using data exchanged with a control target;

execution module configured to cause a processor to execute a plurality of programs including the control program, the execution module being included in each device; and disposition module configured to cause a first processor to dispose a plurality of control programs in at least one of the plurality of devices, wherein the disposition module is configured to cause the first processor to determine the at least one of the plurality of devices in which the control program is disposed based on a communication delay time between the plurality of devices and information about a resource usable for execution of the control program of each of the plurality of devices for each control program, wherein the network implements a communication protocol with cyclic communication which guarantees an arrival time of data according to a time-sensitive networking (TSN) standard, wherein each device is time-synchronized with each other, wherein the information about the resource usable for the execution of the control program of each of the devices includes a time during which the processor is usable for the execution of the control program, and wherein the disposition module is configured to cause the first processor to compare, for each device, the usable time of the device with the time based on the time synchronization and shared among the plurality of devices, and determine the device where the control program is disposed based on the comparison.

2. The control system according to claim 1, wherein the information about the resource usable for the execution of the control program of each of the plurality of devices includes a size of a storage area usable for the execution of the control program in the program storage.

3. The control system according to claim 2, wherein the disposition module is further configured to cause the first processor to inquire each of the plurality of devices about the size of the storage area usable for the execution of the control program.

4. The control system according to claim 1, wherein the disposition module is further configured to cause the first processor to inquire each of the plurality of devices about the time during which the processor is usable for the execution of the control program.

5. The control system according to claim 1, further comprising a module configured to cause a processor to measure the communication delay time between the plurality of devices.

6. The control system according to claim 1, wherein the communication delay time between the plurality of devices includes a communication delay time required for communication of data exchanged with the control target.

7. The control system according to claim 1, wherein the plurality of devices includes an information processing device and at least one control device, the information processing device and at least one control device being time-synchronized with each other, the execution module of the information processing device causes a processor to execute the control program using data received from each of the at least one control device, the execution module of the each control device causes a processor to execute input and output program that transfers data exchanged with the control target to the information processing device and outputs the control data received from the information processing device to the control target, and the control program and the input and output program are executed within a time based on the time synchronization and shared between the each control device and the information processing device.

8. The control system according to claim 1, wherein the disposition module is further configured to cause the first processor to determine the at least one of the plurality of devices in which the control program is disposed based on the communication delay time between the plurality of devices and the information about the resource usable for the execution of the control program of each of the plurality of devices for each control program in each failure mode of the control system.

9. The control system according to claim 1, wherein the disposition module is further configured to cause the first processor to determine a device that executes the control program from among the at least one of the plurality of devices for which a disposition of the control program is determined.

10. The control system according to claim 1, wherein the communication delay time includes a time required for communication of the data exchanged between the control program and the controlled object, wherein the time required for communicating the data is based on a time required for the device to communicate data corresponding to variables referred by the control program with the controlled object and to complete the communicated data setting for the variables.

11. A setting device that performs setting on a control system including a control target and a plurality of devices, the control target and the plurality of devices being connected to a network, each device including:

program storage configured to store a control program calculating control data using data exchanged with a control target; and execution module causing a processor to execute a plurality of programs including the control program, the setting device comprising a disposition module configured to cause a first processor to dispose a plurality of control programs in at least one of the plurality of devices, wherein the disposition module is configured to cause the first processor to determine the at least one of the plurality of devices in which the control program is disposed based on a communication delay time between the plurality of devices and information about a resource usable for execution of the control program of each of the plurality of devices for each control program, wherein the network implements a communication protocol with cyclic communication which guarantees an arrival time of data according to a time-sensitive networking (TSN) standard, wherein each device is time-synchronized with each other, wherein the information about the resource usable for the execution of the control program of each of the devices includes a time during which the processor is usable for the execution of the control program, and wherein the disposition module is configured to cause the first processor to compare, for each device, the usable time of the device with the time based on the time synchronization and shared among the plurality of devices, and determine the device where the control program is disposed based on the comparison.

12. The setting device according to claim 11, wherein the communication delay time includes a time required for communication of the data exchanged between the control program and the controlled object, wherein the time required for communicating the data is based on a time required for the device to communicate data corresponding to variables referred by the control program with the controlled object and to complete the communicated data setting for the variables.

13. A non-transitory computer-readable storage medium for storing a computer program that performs setting on a control system including a control target and a plurality of devices, the control target and the plurality of devices being connected to a network, each device including:

program storage configured to store a control program calculating control data using data exchanged with a control target; and execution module causing a processor to execute a plurality of programs including a control program, the execution module being included in each of the plurality of devices, the computer program causes a computer to execute:

acquiring a communication delay time between the plurality of devices and information about a resource usable for execution of the control program of each of the plurality of devices for each control program; and determining a device in which the control program is disposed from among the plurality of devices based on the communication delay time between the plurality of devices and the information about the resource usable for the execution of the control program of each of the plurality of devices for each control program, wherein the network implements a communication protocol with cyclic communication which guarantees an arrival time of data according to a time-sensitive networking (TSN) standard, wherein each device is time-synchronized with each other, wherein the information about the resource usable for the execution of the control program of each of the devices includes a time during which the processor is usable for the execution of the control program, and wherein the computer program causes a computer to execute: comparing, for each device, the usable time of the device with the time based on the time synchronization and shared among the plurality of devices, and determining the device where the control program is disposed based on the comparison.

14. The non-transitory computer-readable storage medium according to claim 13, wherein the communication delay time includes a time required for communication of the data exchanged between the control program and the controlled object, wherein the time required for communicating the data is based on a time required for the device to communicate data corresponding to variables referred by the control program with the controlled object and to complete the communicated data setting for the variables.

* * * * *